US012302356B2

(12) United States Patent
Shimezawa et al.

(10) Patent No.: US 12,302,356 B2
(45) Date of Patent: *May 13, 2025

(54) TERMINAL DEVICE, BASE STATION DEVICE AND COMMUNICATION METHOD THAT USE DIFFERENT SIGNAL WAVEFORMS BASED ON CONTROL INFORMATION WHEN UPLINK CHANNEL IS SHARED CHANNEL

(71) Applicant: Sony Group Corporation, Tokyo (JP)

(72) Inventors: Kazuyuki Shimezawa, Kanagawa (JP); Naoki Kusashima, Kanagawa (JP); Hiromasa Uchiyama, Tokyo (JP); Hiroki Matsuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/420,776

(22) Filed: Jan. 24, 2024

(65) Prior Publication Data

US 2024/0163890 A1 May 16, 2024

Related U.S. Application Data

(63) Continuation of application No. 17/183,370, filed on Feb. 24, 2021, now Pat. No. 11,943,779, which is a (Continued)

(30) Foreign Application Priority Data

Nov. 2, 2016 (JP) .................................. 2016-214779

(51) Int. Cl.
H04W 72/23 (2023.01)
H04B 7/06 (2006.01)
(Continued)

(52) U.S. Cl.
CPC .......... *H04W 72/23* (2023.01); *H04B 7/0697* (2013.01); *H04L 5/001* (2013.01);
(Continued)

(58) Field of Classification Search
CPC ... H04W 72/23; H04W 72/044; H04W 72/04; H04B 7/0697; H04L 5/001;
(Continued)

(56) References Cited

U.S. PATENT DOCUMENTS 8,379,581 B2 2/2013 Imamura
11,743,897 B2 * 8/2023 Luo ...................... H04W 72/21
370/329
(Continued)

FOREIGN PATENT DOCUMENTS

CN 102239733 A 11/2011
CN 102859923 A 1/2013
(Continued)

OTHER PUBLICATIONS

International Search Report mailed on Dec. 26, 2017 for PCT/JP2017/036973 filed on Oct. 12, 2017, 10 pages including English Translation.
(Continued)

*Primary Examiner* — Jael M Ulysse
(74) *Attorney, Agent, or Firm* — XSENSUS LLP

(57) ABSTRACT

A terminal device that performs communication with a base station, including:
a wireless transmitter that transmits an uplink channel using a first signal waveform or a second signal waveform,
the first signal waveform is a signal generated without performing a predetermined conversion process, and the second signal waveform is a signal generated by performing the predetermined conversion process,
(Continued)

in a case where the uplink channel is a predetermined control channel, the second signal waveform is used for transmitting the uplink channel, and in a case where the uplink channel is a predetermined shared channel, either the first signal waveform or the second signal waveform is used for transmitting the uplink channel based on control information uniquely notified from the base station to the terminal device.

18 Claims, 18 Drawing Sheets

Related U.S. Application Data continuation of application No. 16/327,328, filed as application No. PCT/JP2017/036973 on Oct. 12, 2017, now Pat. No. 10,952,198.

(51) Int. Cl.
| | |
|---|---|
| H04L 5/00 | (2006.01) |
| H04L 27/00 | (2006.01) |
| H04L 27/26 | (2006.01) |
| H04W 72/04 | (2023.01) |
| H04W 72/044 | (2023.01) |

(52) U.S. Cl.
CPC ........ H04L 5/0094 (2013.01); H04L 27/0008 (2013.01); H04L 27/2636 (2013.01); H04L 27/2646 (2013.01); H04W 72/04 (2013.01); H04W 72/044 (2013.01)

(58) Field of Classification Search
CPC ............... H04L 5/0094; H04L 27/0008; H04L 27/2636; H04L 27/2646
See application file for complete search history.

(56) References Cited

U.S. PATENT DOCUMENTS

| | | | |
|---|---|---|---|
| 2010/0142455 A1 | 6/2010 | Imamura | |
| 2011/0205966 A1 | 8/2011 | Iwai et al. | |
| 2011/0305161 A1* | 12/2011 | Ekpenyong | H04L 5/001 370/252 |
| 2014/0050192 A1 | 2/2014 | Kim et al. | |
| 2014/0086167 A1 | 3/2014 | Seo et al. | |
| 2014/0328260 A1 | 11/2014 | Papasakellariou et al. | |
| 2015/0085788 A1 | 3/2015 | Kim et al. | |
| 2015/0092528 A1 | 4/2015 | Luo et al. | |
| 2015/0181589 A1* | 6/2015 | Luo | H04L 5/0073 370/329 |
| 2015/0358124 A1 | 12/2015 | Suzuki et al. | |
| 2016/0270070 A1 | 9/2016 | Mukkavilli et al. | |
| 2016/0337984 A1 | 11/2016 | Takeda et al. | |
| 2017/0311296 A1 | 10/2017 | Onggosanusi et al. | |
| 2018/0007673 A1* | 1/2018 | Fwu | H04W 72/12 |
| 2018/0035423 A1 | 2/2018 | Wang et al. | |
| 2018/0049173 A1* | 2/2018 | Chen | H04W 76/28 |
| 2018/0092086 A1* | 3/2018 | Nammi | H04L 27/26025 |
| 2019/0261397 A1* | 8/2019 | Takeda | H04L 5/0094 |
| 2019/0268854 A1* | 8/2019 | Suzuki | H04L 5/0094 |
| 2020/0036470 A1* | 1/2020 | Olesen | H04L 27/0008 |

FOREIGN PATENT DOCUMENTS

| | | |
|---|---|---|
| CN | 103828256 A | 5/2014 |
| CN | 104160772 A | 11/2014 |
| CN | 105191190 A | 12/2015 |
| EP | 2938153 A1 | 10/2015 |
| JP | 2009-542164 A | 11/2009 |
| JP | 2012-034145 A | 2/2012 |
| JP | 2012-511266 A | 5/2012 |
| WO | 2008/003087 A2 | 1/2008 |
| WO | 2009/153978 A1 | 12/2009 |
| WO | 2015/108009 A1 | 7/2015 |
| WO | 2016/130175 A1 | 8/2016 |

OTHER PUBLICATIONS

3GPP, "Technical Specification Group Radio Access Network; Study on Scenarios and Requirements for Next Generation Access Technologies", 3GPP TR 38.913 V0.3.0 Release 14, Mar. 2016, pp. 1-30.

Qualcomm Incorporated, "Coverage analysis of DFT-s-OFDM and OFDM with low PAPR techniques", 3GPP TSG-RAN WG1 Meeting No. 86 R1-1610113, Oct. 10-14, 2016, Lisbon, Portugal, pp. 1-9.

Oppo, "Numerology and Frame structure design considerations for NR", 3GPP TSG RAN WG1 Meeting No. 84bis R1-162338, Apr. 11-15, 2016, Busan, Korea, 3 pages.

Extended Search Report Issued in European Application 17868035. 1-1231 dated Aug. 21, 2019.

Nokia, et al., "On UL Waveforms below 40 GHZ", 3GPP TSG-RAN WG1 #86 Bis, R1-1609567, 11 Pages total, (Oct. 10-14, 2016).

Office Action issued Aug. 18, 2020 in Japanese Patent Application No. 2016-214779, 19 pages.

Qualcomm Incorporated, "User Multiplexing of DFTs-OFDM and OFDM in uplink", 3GPP TSG-RAN WG1 #86, R1-1610114, Oct. 10-14, 2016, 5 pages.

Motorola: "Impact of Introducing OFDMA Option to LTE-A UL Access".3GPP Draft; R1-084404 LTE-A UL Scheme OFDM Impact Study (Motorola). 3rd Generation Partnership Project (3GPP). Mobile Competence Centre. 650.Route Des Lucioles. F-06921 Sophia-Antipolis Ced Ex ;France. No. Prague, Czech Republic; Nov. 5, 2008, Nov. 5, 2008 (Nov. 5, 2008), XP050317666,[retrieved on Nov. 5, 2008].

Qualcomm Incorporated, "User Multiplexing of DFTs-OFDM and OFDM in uplink", 3GPP TSG-RAN WG1 #86, R1-1610114, Oct. 10-14, 2016, Lisbon, Portugal.

Panasonic: Consideration on Multicarrier Transmission scheme for LTE-Adv uplink, 3GPP Draft; R1-082398, 3rd Generation Partnership Project (3GPP), Mobile Competence Centre; 650, Route Des Lucioles; V F-06921 Sophia-Antipolis Cedex ; France, Jun. 24, 2008 (Jun. 24, 2008), vol. RAN WG1, No. Warsaw, Poland; Jun. 24, 2008 XP050110679, [retrieved on Jun. 24, 2008].

Intel Corporation: "Remaining details of NB-PDCCH design", 3GPP Draft; R1-161889. Intel NB-PDCCH, 3rd Generation Partnership Project (3GPP), Mar. 16, 2016, vol. RAN WG1, 6 pgs, XP051081006.

\* cited by examiner

FIG. 5

| | SUB CARRIER INTERVAL | MAXIMUM BANDWIDTH OF COMPONENT CARRIER | CP LENGTH TYPE | NUMBER OF SYMBOLS PER SUB FRAME | SUB FRAME LENGTH | WIRELESS FRAME LENGTH | NUMBER OF SUB CARRIERS PER RESOURCE BLOCK IN NR CELL |
|---|---|---|---|---|---|---|---|
| PARAMETER SET 0 | 15 kHz | 20MHz | TYPE 1 | 14 | 1ms | 10ms | 12 |
| PARAMETER SET 1 | 7.5 kHz | 1.4MHz | TYPE 1 | 70 | 10ms | 10ms | 24 |
| PARAMETER SET 2 | 30 kHz | 80MHz | TYPE 1 | 7 | 0.25ms | 10ms | 6 |
| PARAMETER SET 3 | 15 kHz | 20MHz | TYPE 2 | 12 | 1ms | 10ms | 12 |
| ... | ... | ... | ... | ... | ... | ... | ... |

TERMINAL DEVICE, BASE STATION DEVICE AND COMMUNICATION METHOD THAT USE DIFFERENT SIGNAL WAVEFORMS BASED ON CONTROL INFORMATION WHEN UPLINK CHANNEL IS SHARED CHANNEL

CROSS-REFERENCE TO RELATED APPLICATIONS

The present application is a continuation of U.S. application Ser. No. 17/183,370, filed Feb. 24, 2021, which is a continuation of U.S. application Ser. No. 16/327,328, filed Feb. 22, 2019 (now U.S. Pat. No. 10,952,198), which is based on PCT filing PCT/JP2017/036973, filed Oct. 12, 2017, which claims priority to JP 2016-214779, filed Nov. 2, 2016, the entire contents of each are incorporated herein by reference.

TECHNICAL FIELD

The present disclosure relates to a terminal device, a base station device, and a communication method.

BACKGROUND ART

Wireless access schemes and wireless networks of cellular mobile communication (hereinafter also referred to as Long Term Evolution (LTE), LTE-Advanced (LTE-A), LTE-Advanced Pro (LTE-A Pro), New Radio (NR), New Radio Access Technology (NRAT), Evolved Universal Terrestrial Radio Access (EUTRA), or Further EUTRA (FEUTRA)) are under review in 3rd Generation Partnership Project (3GPP). Further, in the following description, LTE includes LTE-A, LTE-A Pro, and EUTRA, and NR includes NRAT and FEUTRA. In LTE and NR, a base station device (base station) is also referred to as an evolved Node B (eNodeB) in LTE, as gNode B in NR, and a terminal device (a mobile station, a mobile station device, or a terminal) is also referred to as a user equipment (UE). LTE and NR are cellular communication systems in which a plurality of areas covered by a base station device is arranged in a cell form. A single base station device may manage a plurality of cells.

NR is a different Radio Access Technology (RAT) from LTE as a wireless access scheme of the next generation of LTE. NR is an access technology capable of handling various use cases including Enhanced Mobile broadband (eMBB), Massive Machine Type Communications (mMTC), and ultra reliable and Low Latency Communications (URLLC). NR is reviewed for the purpose of a technology framework corresponding to use scenarios, request conditions, placement scenarios, and the like in such use cases. The details of the scenarios or request conditions of NR are disclosed in Non-Patent Literature 1.

Next, signal waveform in a wireless communication system such as LTE or NR will be described. In LTE, cyclic prefix-orthogonal frequency division multiplexing (CP-OFDM) is used in downlink communication, and single carrier-frequency division multiple access (SC-FDMA) is used in uplink communication. In NR, CP-OFDM is used in downlink communication, and CP-OFDM and SC-FDMA are both supported in uplink communication. The details of the signal waveform of the uplink communication in NR are disclosed in Non-Patent Literature 2.

CITATION LIST

Non-Patent Literature

Non-Patent Literature 1: 3rd Generation Partnership Project; Technical Specification Group Radio Access Network; Study on Scenarios and Requirements for Next Generation Access Technologies; (Release 14), 3GPP TR 38.913 V0. 3.0 (2016-03).

Non-Patent Literature 2: Coverage analysis of DFT-s-OFDM and OFDM with low PAPR techniques, Qualcomm Incorporated, R1-1610113, 3GPP TSG RAN WG1 Meeting #86bis, October 2016.

DISCLOSURE OF INVENTION

Technical Problem

As described above, in NR, in order to support various use cases flexibly, a transmission signal, a frame configuration, a channel configuration, and the like are likely to be expanded as compared with LTE. Therefore, in NR supporting a plurality of signal waveforms, control of a suitable signal waveform is necessary.

The present disclosure was made in light of the above problems, and it is an object of the present disclosure to provide a base station device, a terminal device, a communication system, a communication method, and an integrated circuit which are capable of causing transmission efficiency of the entire system to be improved significantly by flexibly designing in accordance with various use cases in a communication system in which a base station device and a terminal device communicate with each other.

Solution to Problem

According to the present disclosure, there is provided a terminal device configured to perform communication with a base station device, including: a wireless transmitting unit configured to transmit an uplink channel using a first signal waveform or a second signal waveform on the basis of control information notified by the base station device. The first signal waveform is a multicarrier signal, and the second signal waveform is a single carrier signal.

In addition, according to the present disclosure, there is provided a base station device configured to perform communication with a terminal device, including: a wireless receiving unit configured to receive an uplink channel transmitted using a first signal waveform or a second signal waveform on the basis of control information of which the terminal device is notified. The first signal waveform is a multicarrier signal, and the second signal waveform is a single carrier signal.

In addition, according to the present disclosure, there is provided a communication method used in a terminal device configured to perform communication with a base station device, including: a step of transmitting an uplink channel using a first signal waveform or a second signal waveform on the basis of control information notified by the base station device. The first signal waveform is a multicarrier signal, and the second signal waveform is a single carrier signal.

In addition, according to the present disclosure, there is provided a communication method used in a base station device configured to perform communication with a terminal device, including: a step of receiving an uplink channel transmitted using a first signal waveform or a second signal waveform on the basis of control information of which the terminal device is notified. The first signal waveform is a multicarrier signal, and the second signal waveform is a single carrier signal.

Advantageous Effects of Invention

As described above, according to the present disclosure, it is possible to cause the transmission efficiency of the entire system to be significantly improved.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating examples of parameter sets related to a transmission signal in an NR cell according to the present embodiment.

MODE(S) FOR CARRYING OUT THE INVENTION

Figure 1:
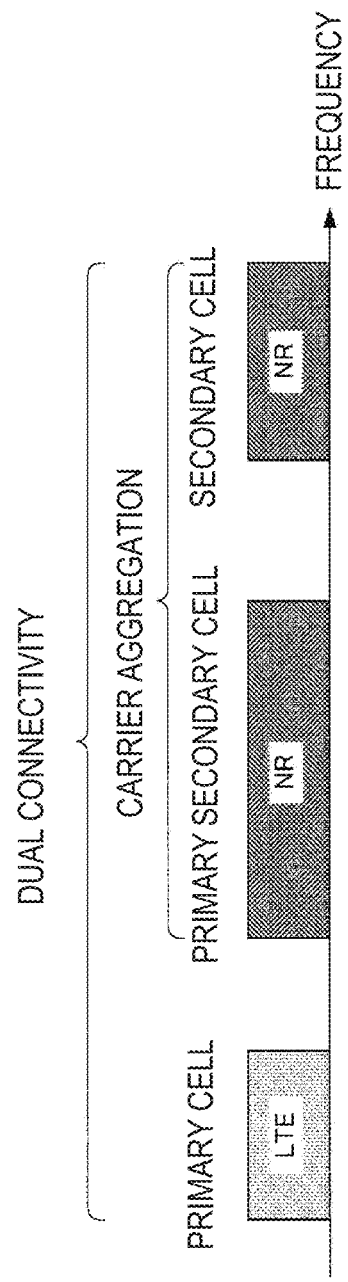
FIG. 1 is a diagram illustrating an example of setting of a component carrier according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted. Further, technologies, functions, methods, configurations, and procedures to be described below and all other descriptions can be applied to LTE and NR unless particularly stated otherwise.

Wireless Communication System in the Present Embodiment

In the present embodiment, a wireless communication system includes at least a base station device 1 and a terminal device 2. The base station device 1 can accommodate multiple terminal devices. The base station device 1 can be connected with another base station device by means of an X2 interface. Further, the base station device 1 can be connected to an evolved packet core (EPC) by means of an S1 interface. Further, the base station device 1 can be connected to a mobility management entity (MME) by means of an S1-MME interface and can be connected to a serving gateway (S-GW) by means of an S1-U interface. The S1 interface supports many-to-many connection between the MME and/or the S-GW and the base station device 1. Further, in the present embodiment, the base station device 1 and the terminal device 2 each support LTE and/or NR.

Wireless Access Technology According to Present Embodiment

In the present embodiment, the base station device 1 and the terminal device 2 each support one or more wireless access technologies (RATs). For example, an RAT includes LTE and NR. A single RAT corresponds to a single cell (component carrier). That is, in a case in which a plurality of RATs is supported, the RATs each correspond to different cells. In the present embodiment, a cell is a combination of a downlink resource, an uplink resource, and/or a sidelink. Further, in the following description, a cell corresponding to LTE is referred to as an LTE cell and a cell corresponding to NR is referred to as an NR cell.

Downlink communication is communication from the base station device 1 to the terminal device 2. Downlink transmission is transmission from the base station device 1 to the terminal device 2 and is transmission of a downlink physical channel and/or a downlink physical signal. Uplink communication is communication from the terminal device 2 to the base station device 1. Uplink transmission is transmission from the terminal device 2 to the base station device 1 and is transmission of an uplink physical channel and/or an uplink physical signal. Sidelink communication is communication from the terminal device 2 to another terminal device 2. Sidelink transmission is transmission from the terminal device 2 to another terminal device 2 and is transmission of a sidelink physical channel and/or a sidelink physical signal.

The sidelink communication is defined for contiguous direct detection and contiguous direct communication between terminal devices. The sidelink communication, a frame configuration similar to that of the uplink and downlink can be used. Further, the sidelink communication can be restricted to some (sub sets) of uplink resources and/or downlink resources.

The base station device 1 and the terminal device 2 can support communication in which a set of one or more cells is used in a downlink, an uplink, and/or a sidelink. A set of a plurality of cells is also referred to as carrier aggregation or dual connectivity. The details of the carrier aggregation and the dual connectivity will be described below. Further, each cell uses a predetermined frequency bandwidth. A maximum value, a minimum value, and a settable value in the predetermined frequency bandwidth can be specified in advance.

FIG. 1 is a diagram illustrating an example of setting of a component carrier according to the present embodiment. In the example of FIG. 1, one LTE cell and two NR cells are set. One LTE cell is set as a primary cell. Two NR cells are set as a primary secondary cell and a secondary cell. Two NR cells are integrated by the carrier aggregation. Further, the LTE cell and the NR cell are integrated by the dual connectivity. Note that the LTE cell and the NR cell may be integrated by carrier aggregation. In the example of FIG. 1, NR may not support some functions such as a function of performing standalone communication since connection can be assisted by an LTE cell which is a primary cell. The function of performing standalone communication includes a function necessary for initial connection.

Figure 2:
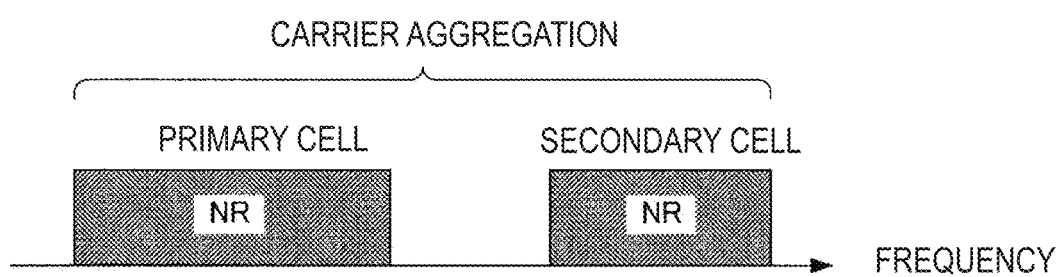
FIG. 2 is a diagram illustrating an example of setting of a component carrier according to the present embodiment.

FIG. 2 is a diagram illustrating an example of setting of a component carrier according to the present embodiment. In the example of FIG. 2, two NR cells are set. The two NR cells are set as a primary cell and a secondary cell, respectively, and are integrated by carrier aggregation. In this case, when the NR cell supports the function of performing standalone communication, assist of the LTE cell is not necessary. Note that the two NR cells may be integrated by dual connectivity.

Radio Frame Configuration in Present Embodiment

In the present embodiment, a radio frame configured with 10 ms (milliseconds) is specified. Each radio frame includes two half frames. A time interval of the half frame is 5 ms. Each half frame includes 5 sub frames. The time interval of the sub frame is 1 ms and is defined by two successive slots. The time interval of the slot is 0.5 ms. An i-th sub frame in the radio frame includes a (2×i)-th slot and a (2×i+1)-th slot. In other words, 10 sub frames are specified in each of the radio frames.

Sub frames include a downlink sub frame, an uplink sub frame, a special sub frame, a sidelink sub frame, and the like.

The downlink sub frame is a sub frame reserved for downlink transmission. The uplink sub frame is a sub frame reserved for uplink transmission. The special sub frame includes three fields. The three fields are a Downlink Pilot Time Slot (DwPTS), a Guard Period (GP), and an Uplink Pilot Time Slot (UpPTS). A total length of DwPTS, GP, and UpPTS is 1 ms. The DwPTS is a field reserved for downlink transmission. The UpPTS is a field reserved for uplink transmission. The GP is a field in which downlink transmission and uplink transmission are not performed. Further, the special sub frame may include only the DwPTS and the GP or may include only the GP and the UpPTS. The special sub frame is placed between the downlink sub frame and the uplink sub frame in time division duplex (TDD) and used to perform switching from the downlink sub frame to the uplink sub frame. The sidelink sub frame is a sub frame reserved or set for sidelink communication. The sidelink is used for contiguous direct communication and contiguous direct detection between terminal devices.

A single radio frame includes a downlink sub frame, an uplink sub frame, a special sub frame, and/or a sidelink sub frame. Further, a single radio frame includes only a downlink sub frame, an uplink sub frame, a special sub frame, or a sidelink sub frame.

A plurality of radio frame configurations is supported. The radio frame configuration is specified by the frame configuration type. The frame configuration type 1 can be applied only to frequency division duplex (FDD). The frame configuration type 2 can be applied only to TDD. The frame configuration type 3 can be applied only to an operation of a licensed assisted access (LAA) secondary cell.

In the frame configuration type 2, a plurality of uplink-downlink configurations is specified. In the uplink-downlink configuration, each of 10 sub frames in one radio frame corresponds to one of the downlink sub frame, the uplink sub frame, and the special sub frame. The sub frame 0, the sub frame 5 and the DwPTS are constantly reserved for downlink transmission. The UpPTS and the sub frame just after the special sub frame are constantly reserved for uplink transmission.

In the frame configuration type 3, 10 sub frames in one radio frame are reserved for downlink transmission. The terminal device 2 treats a sub frame by which PDSCH or a detection signal is not transmitted, as an empty sub frame. Unless a predetermined signal, channel and/or downlink transmission is detected in a certain sub frame, the terminal device 2 assumes that there is no signal and/or channel in the sub frame. The downlink transmission is exclusively occupied by one or more consecutive sub frames. The first sub frame of the downlink transmission may be started from any one in that sub frame. The last sub frame of the downlink transmission may be either completely exclusively occupied or exclusively occupied by a time interval specified in the DwPTS.

Further, in the frame configuration type 3, 10 sub frames in one radio frame may be reserved for uplink transmission. Further, each of 10 sub frames in one radio frame may correspond to any one of the downlink sub frame, the uplink sub frame, the special sub frame, and the sidelink sub frame.

The base station device 1 may transmit a downlink physical channel and a downlink physical signal in the DwPTS of the special sub frame. The base station device 1 can restrict transmission of the PBCH in the DwPTS of the special sub frame. The terminal device 2 may transmit uplink physical channels and uplink physical signals in the UpPTS of the special sub frame. The terminal device 2 can restrict transmission of some of the uplink physical channels and the uplink physical signals in the UpPTS of the special sub frame.

Note that a time interval in single transmission is referred to as a transmission time interval (TTI) and 1 ms (1 sub frame) is defined as 1 TTI in LTE.

Frame Configuration of LTE in Present Embodiment

Figure 3:
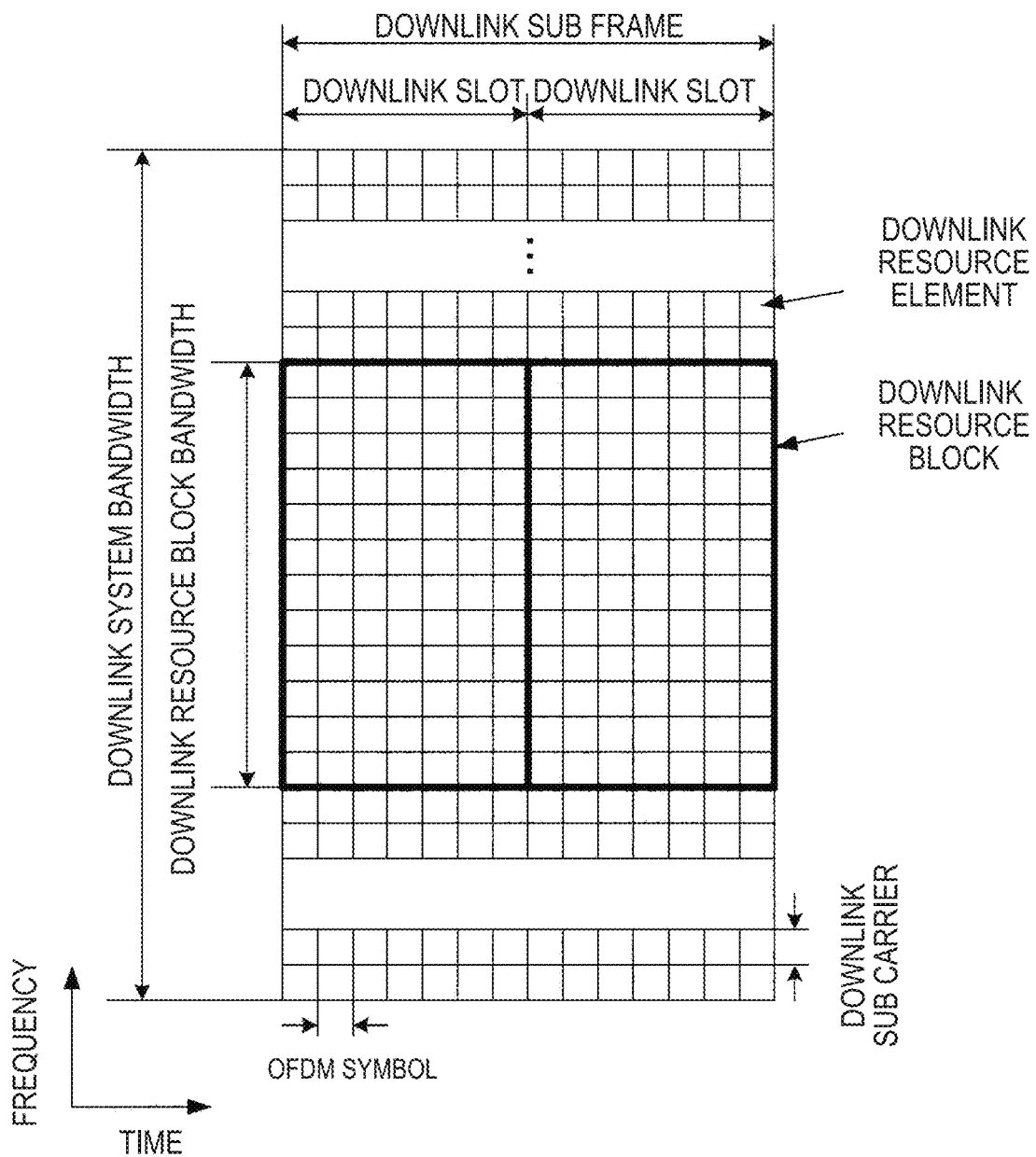
FIG. 3 is a diagram illustrating an example of a downlink sub frame of LTE according to the present embodiment.

FIG. 3 is a diagram illustrating an example of a downlink sub frame of LTE according to the present embodiment. The diagram illustrated in FIG. 3 is referred to as a downlink resource grid of LTE. The base station device 1 can transmit a downlink physical channel of LTE and/or a downlink physical signal of LTE in a downlink sub frame to the terminal device 2. The terminal device 2 can receive a downlink physical channel of LTE and/or a downlink physical signal of LTE in a downlink sub frame from the base station device 1.

Figure 4:
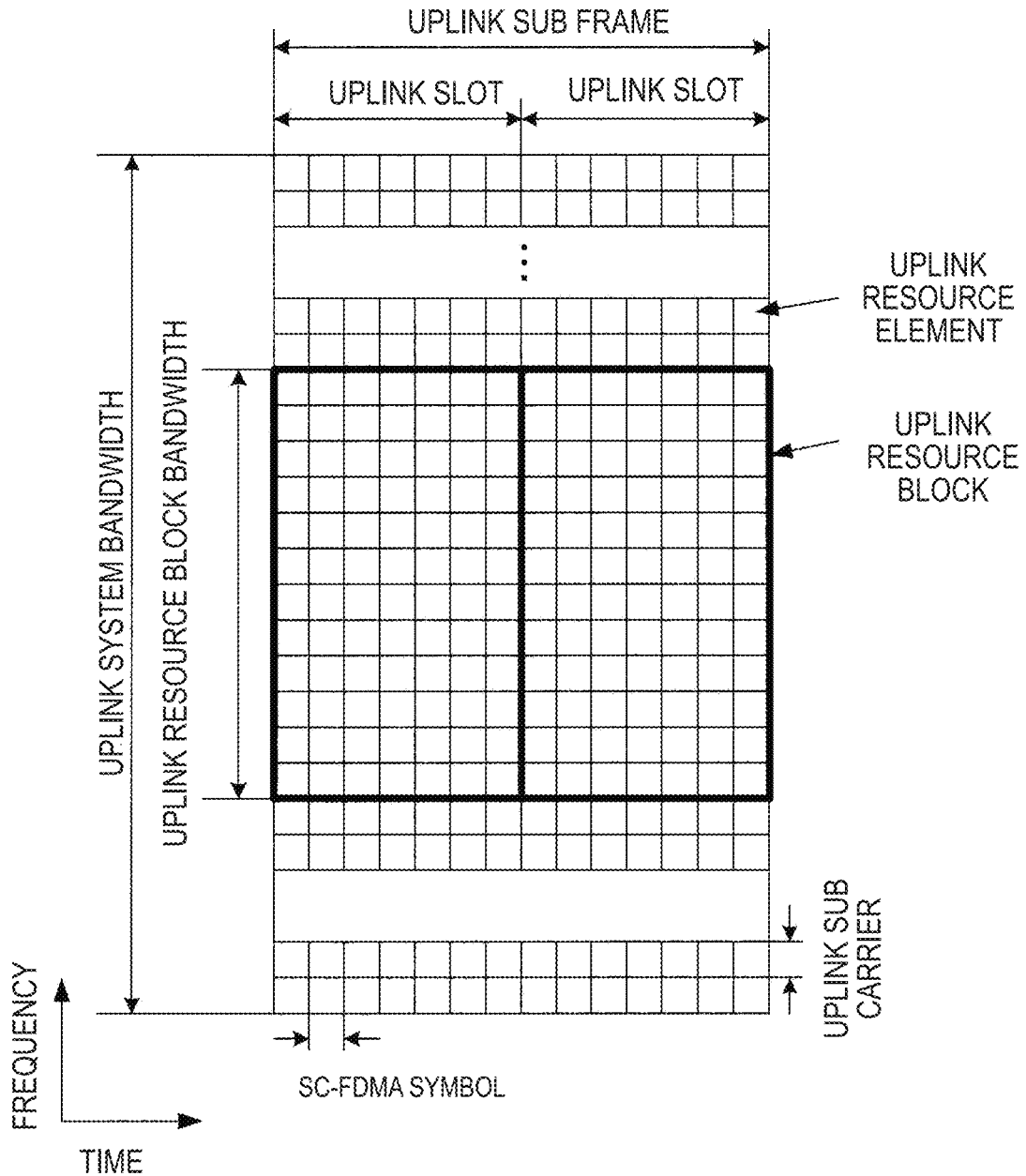
FIG. 4 is a diagram illustrating an example of an uplink sub frame of LTE according to the present embodiment.

FIG. 4 is a diagram illustrating an example of an uplink sub frame of LTE according to the present embodiment. The diagram illustrated in FIG. 4 is referred to as an uplink resource grid of LTE. The terminal device 2 can transmit an uplink physical channel of LTE and/or an uplink physical signal of LTE in an uplink sub frame to the base station device 1. The base station device 1 can receive an uplink physical channel of LTE and/or an uplink physical signal of LTE in an uplink sub frame from the terminal device 2.

In the present embodiment, the LTE physical resources can be defined as follows. One slot is defined by a plurality of symbols. The physical signal or the physical channel transmitted in each of the slots is represented by a resource grid. In the downlink, the resource grid is defined by a plurality of subcarriers in a frequency direction and a plurality of OFDM symbols in a time direction. In the uplink, the resource grid is defined by a plurality of subcarriers in the frequency direction and a plurality of SC-FDMA symbols in the time direction. The number of subcarriers or the number of resource blocks may be decided depending on a bandwidth of a cell. The number of symbols in one slot is decided by a type of cyclic prefix (CP). The type of CP is a normal CP or an extended CP. In the normal CP, the number of OFDM symbols or SC-FDMA symbols constituting one slot is 7. In the extended CP, the number of OFDM symbols or SC-FDMA symbols constituting one slot is 6. Each element in the resource grid is referred to as a resource element. The resource element is identified using an index (number) of a subcarrier and an index (number) of a symbol. Further, in the description of the present embodiment, the OFDM symbol or SC-FDMA symbol is also referred to simply as a symbol.

The resource blocks are used for mapping a certain physical channel (the PDSCH, the PUSCH, or the like) to resource elements. The resource blocks include virtual resource blocks and physical resource blocks. A certain physical channel is mapped to a virtual resource block. The virtual resource blocks are mapped to physical resource blocks. One physical resource block is defined by a predetermined number of consecutive symbols in the time domain. One physical resource block is defined from a predetermined number of consecutive subcarriers in the frequency domain. The number of symbols and the number of subcarriers in one physical resource block are decided on the basis of a parameter set in accordance with a type of CP, a subcarrier interval, and/or a higher layer in the cell. For example, in a case in which the type of CP is the normal CP, and the subcarrier interval is 15 kHz, the number of symbols in one physical resource block is 7, and the number of subcarriers is 12. In this case, one physical resource block includes (7×12) resource elements. The physical resource blocks are numbered from 0 in the frequency domain. Further, two resource blocks in one sub frame corresponding to the same physical resource block number are defined as a physical resource block pair (a PRB pair or an RB pair).

In each LTE cell, one predetermined parameter is used in a certain sub frame. For example, the predetermined parameter is a parameter (physical parameter) related to a transmission signal. Parameters related to the transmission signal include a CP length, a subcarrier interval, the number of symbols in one sub frame (predetermined time length), the number of subcarriers in one resource block (predetermined frequency band), a multiple access scheme, a signal waveform, and the like.

That is, In the LTE cell, a downlink signal and an uplink signal are each generated using one predetermined parameter in a predetermined time length (for example, a sub frame). In other words, in the terminal device 2, it is assumed that a downlink signal to be transmitted from the base station device 1 and an uplink signal to be transmitted to the base station device 1 are each generated with a predetermined time length with one predetermined parameter. Further, the base station device 1 is set such that a downlink signal to be transmitted to the terminal device 2 and an uplink signal to be transmitted from the terminal device 2 are each generated with a predetermined time length with one predetermined parameter.

Frame Configuration of NR in Present Embodiment

In each NR cell, one or more predetermined parameters are used in a certain predetermined time length (for example, a sub frame). That is, in the NR cell, a downlink signal and an uplink signal are each generated using or more predetermined parameters in a predetermined time length. In other words, in the terminal device 2, it is assumed that a downlink signal to be transmitted from the base station device 1 and an uplink signal to be transmitted to the base station device 1 are each generated with one or more predetermined parameters in a predetermined time length. Further, the base station device 1 is set such that a downlink signal to be transmitted to the terminal device 2 and an uplink signal to be transmitted from the terminal device 2 are each generated with a predetermined time length using one or more predetermined parameters. In a case in which the plurality of predetermined parameters is used, a signal generated using the predetermined parameters is multiplexed in accordance with a predetermined method. For example, the predetermined method includes Frequency Division Multiplexing (FDM), Time Division Multiplexing (TDM), Code Division Multiplexing (CDM), and/or Spatial Division Multiplexing (SDM).

In a combination of the predetermined parameters set in the NR cell, a plurality of kinds of parameter sets can be specified in advance.

FIG. 5 is a diagram illustrating examples of the parameter sets related to a transmission signal in the NR cell. In the example of FIG. 5, parameters of the transmission signal included in the parameter sets include a subcarrier interval, the number of subcarriers per resource block in the NR cell, the number of symbols per sub frame, and a CP length type. The CP length type is a type of CP length used in the NR cell. For example, CP length type 1 is equivalent to a normal CP in LTE and CP length type 2 is equivalent to an extended CP in LTE.

The parameter sets related to a transmission signal in the NR cell can be specified individually with a downlink and an uplink. Further, the parameter sets related to a transmission signal in the NR cell can be set independently with a downlink and an uplink.

Figure 6:
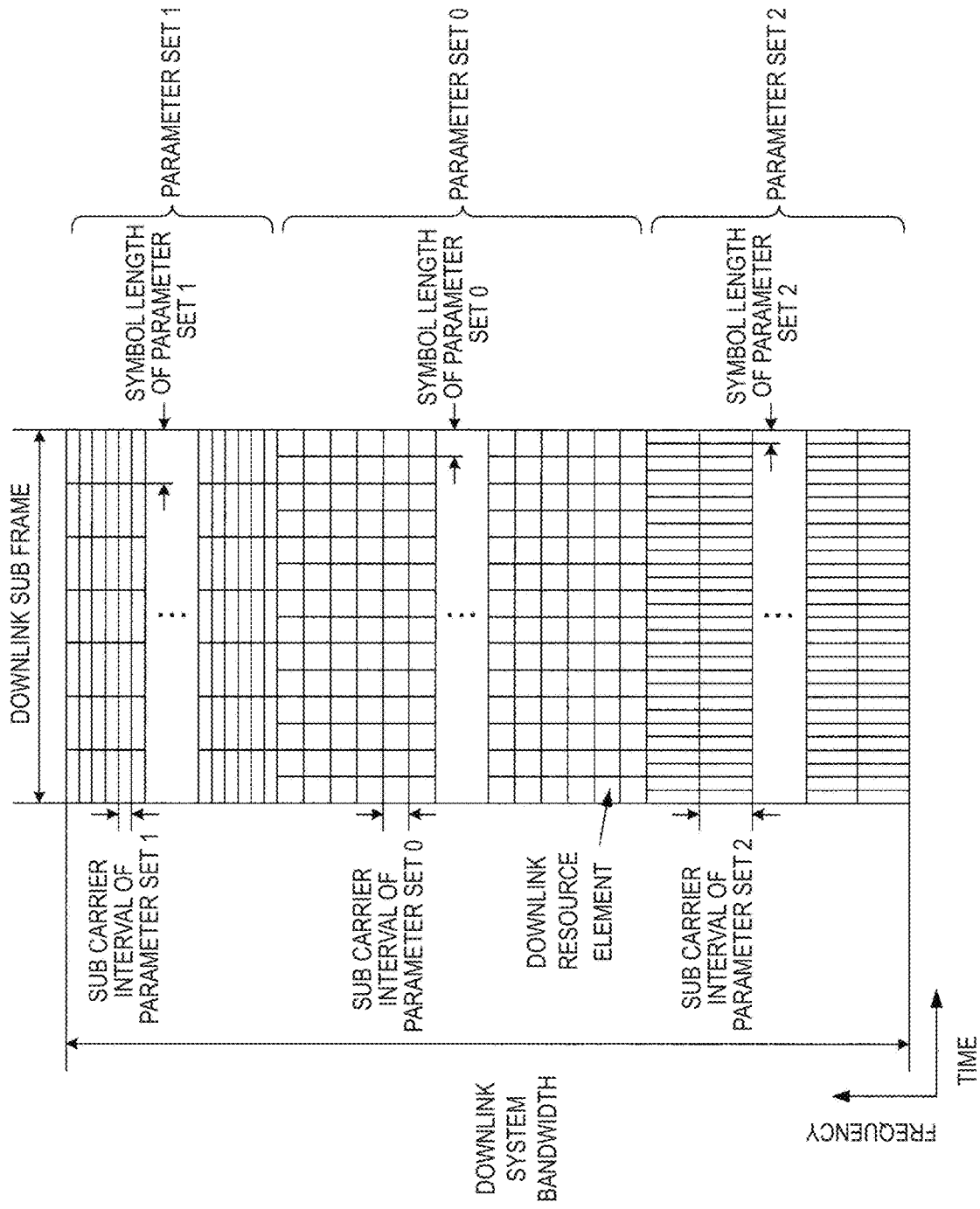
FIG. 6 is a diagram illustrating an example of an NR downlink sub frame of the present embodiment.

FIG. 6 is a diagram illustrating an example of an NR downlink sub frame of the present embodiment. In the example of FIG. 6, signals generated using parameter set 1, parameter set 0, and parameter set 2 are subjected to FDM in a cell (system bandwidth). The diagram illustrated in FIG. 6 is also referred to as a downlink resource grid of NR. The base station device 1 can transmit the downlink physical channel of NR and/or the downlink physical signal of NR in a downlink sub frame to the terminal device 2. The terminal device 2 can receive a downlink physical channel of NR and/or the downlink physical signal of NR in a downlink sub frame from the base station device 1.

Figure 7:
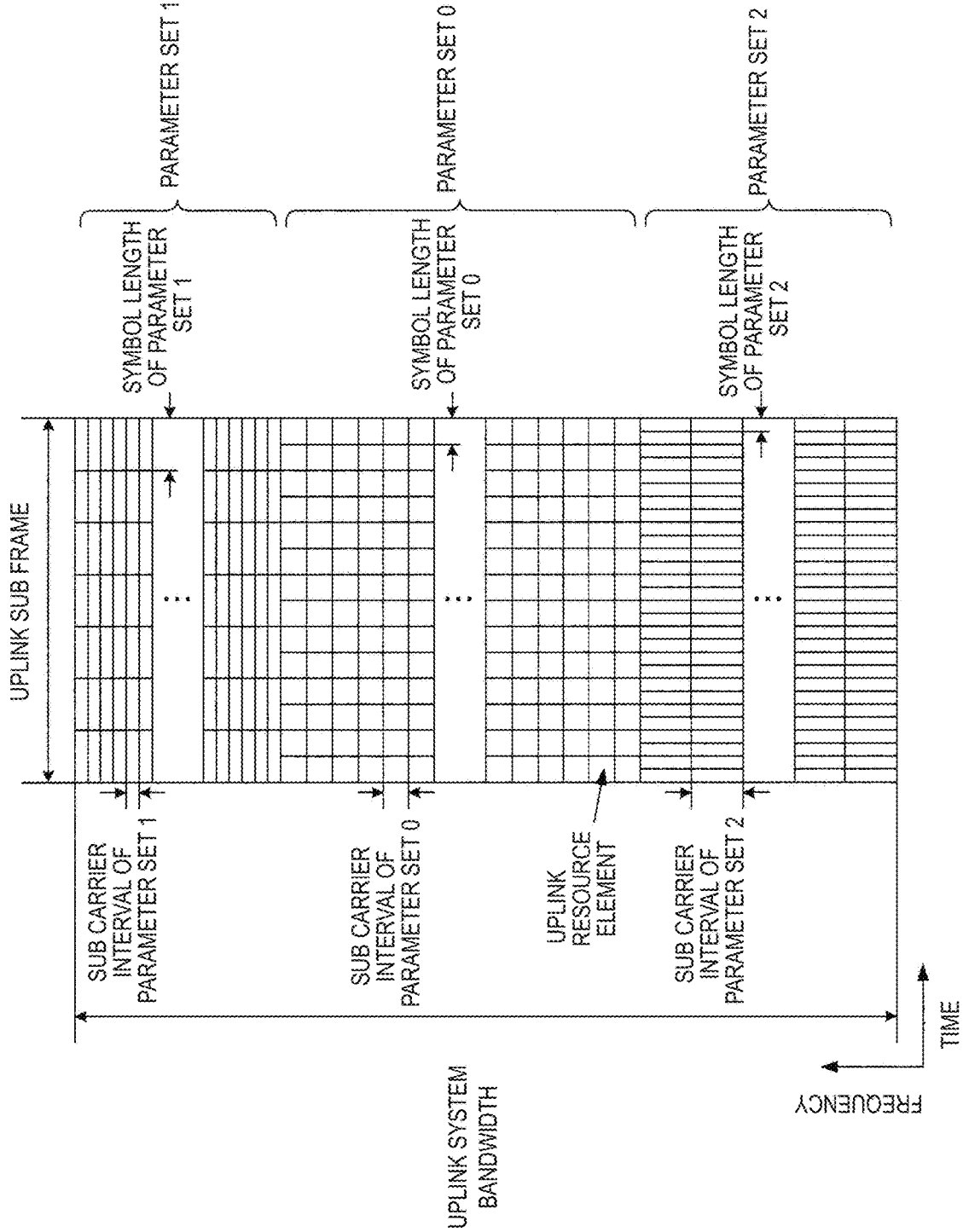
FIG. 7 is a diagram illustrating an example of an NR uplink sub frame of the present embodiment.

FIG. 7 is a diagram illustrating an example of an NR uplink sub frame of the present embodiment. In the example of FIG. 7, signals generated using parameter set 1, parameter set 0, and parameter set 2 are subjected to FDM in a cell (system bandwidth). The diagram illustrated in FIG. 6 is also referred to as an uplink resource grid of NR. The base station device 1 can transmit the uplink physical channel of NR and/or the uplink physical signal of NR in an uplink sub frame to the terminal device 2. The terminal device 2 can receive an uplink physical channel of NR and/or the uplink physical signal of NR in an uplink sub frame from the base station device 1.

Antenna Port in Present Embodiment

An antenna port is defined so that a propagation channel carrying a certain symbol can be inferred from a propagation channel carrying another symbol in the same antenna port. For example, different physical resources in the same antenna port can be assumed to be transmitted through the same propagation channel. In other words, for a symbol in a certain antenna port, it is possible to estimate and demodulate a propagation channel in accordance with the reference signal in the antenna port. Further, there is one resource grid for each antenna port. The antenna port is defined by the reference signal. Further, each reference signal can define a plurality of antenna ports.

The antenna port is specified or identified with an antenna port number. For example, antenna ports 0 to 3 are antenna ports with which CRS is transmitted. That is, the PDSCH transmitted with antenna ports 0 to 3 can be demodulated to CRS corresponding to antenna ports 0 to 3.

In a case in which two antenna ports satisfy a predetermined condition, the two antenna ports can be regarded as being a quasi co-location (QCL). The predetermined condition is that a wide area characteristic of a propagation channel carrying a symbol in one antenna port can be inferred from a propagation channel carrying a symbol in another antenna port. The wide area characteristic includes a delay dispersion, a Doppler spread, a Doppler shift, an average gain, and/or an average delay.

In the present embodiment, the antenna port numbers may be defined differently for each RAT or may be defined commonly between RATs. For example, antenna ports 0 to 3 in LTE are antenna ports with which CRS is transmitted. In the NR, antenna ports 0 to 3 can be set as antenna ports with which CRS similar to that of LTE is transmitted. Further, in NR, the antenna ports with which CRS is transmitted like LTE can be set as different antenna port numbers from antenna ports 0 to 3. In the description of the present embodiment, predetermined antenna port numbers can be applied to LTE and/or NR.

Physical Channel and Physical Signal in Present Embodiment

In the present embodiment, physical channels and physical signals are used.

The physical channels include a downlink physical channel, an uplink physical channel, and a sidelink physical channel. The physical signals include a downlink physical signal, an uplink physical signal, and a sidelink physical signal.

In LTE, a physical channel and a physical signal are referred to as an LTE physical channel and an LTE physical signal. In NR, a physical channel and a physical signal are referred to as an NR physical channel and an NR physical signal. The LTE physical channel and the NR physical channel can be defined as different physical channels, respectively. The LTE physical signal and the NR physical signal can be defined as different physical signals, respectively. In the description of the present embodiment, the LTE physical channel and the NR physical channel are also simply referred to as physical channels, and the LTE physical signal and the NR physical signal are also simply referred to as physical signals. That is, the description of the physical channels can be applied to any of the LTE physical channel and the NR physical channel. The description of the physical signals can be applied to any of the LTE physical signal and the NR physical signal.

NR Physical Channel and NR Physical Signal in Present Embodiment

In LTE, the description of the physical channel and the physical signal can also be applied to the NR physical channel and the NR physical signal, respectively. The NR physical channel and the NR physical signal are referred to as the following.

The NR downlink physical channel includes an NR-PBCH, an NR-PCFICH, an NR-PHICH, an NR-PDCCH, an NR-EPDCCH, an NR-MPDCCH, an NR-R-PDCCH, an NR-PDSCH, an NR-PMCH, and the like.

The NR downlink physical signal includes an NR-SS, an NR-DL-RS, an NR-DS, and the like. The NR-SS includes an NR-PSS, an NR-SSS, and the like. The NR-RS includes an NR-CRS, an NR-PDSCH-DMRS, an NR-EPDCCH-DMRS, an NR-PRS, an NR-CSI-RS, an NR-TRS, and the like.

The NR uplink physical channel includes an NR-PUSCH, an NR-PUCCH, an NR-PRACH, and the like.

The NR uplink physical signal includes an NR-UL-RS. The NR-UL-RS includes an NR-UL-DMRS, an NR-SRS, and the like.

The NR sidelink physical channel includes an NR-PSBCH, an NR-PSCCH, an NR-PSDCH, an NR-PSSCH, and the like.

Downlink Physical Channel in Present Embodiment

The PDCCH and the EPDCCH are used to transmit downlink control information (DCI). Mapping of an information bit of the downlink control information is defined as a DCI format. The downlink control information includes a downlink grant and an uplink grant. The downlink grant is also referred to as a downlink assignment or a downlink allocation.

The PDCCH is transmitted by a set of one or more consecutive control channel elements (CCEs). The CCE includes 9 resource element groups (REGs). An REG includes 4 resource elements. In a case in which the PDCCH is constituted by n consecutive CCEs, the PDCCH starts with a CCE satisfying a condition that a remainder after dividing an index (number) i of the CCE by n is 0.

The EPDCCH is transmitted by a set of one or more consecutive enhanced control channel elements (ECCEs). The ECCE is constituted by a plurality of enhanced resource element groups (EREGs).

The downlink grant is used for scheduling of the PDSCH in a certain cell. The downlink grant is used for scheduling of the PDSCH in the same sub frame as a sub frame in which the downlink grant is transmitted. The uplink grant is used for scheduling of the PUSCH in a certain cell. The uplink grant is used for scheduling of a single PUSCH in a fourth sub frame from a sub frame in which the uplink grant is transmitted or later.

A cyclic redundancy check (CRC) parity bit is added to the DCI. The CRC parity bit is scrambled using a radio network temporary identifier (RNTI). The RNTI is an identifier that can be specified or set in accordance with a purpose of the DCI or the like. The RNTI is an identifier specified in a specification in advance, an identifier set as information specific to a cell, an identifier set as information specific to the terminal device 2, or an identifier set as information specific to a group to which the terminal device 2 belongs. For example, in monitoring of the PDCCH or the EPDCCH, the terminal device 2 descrambles the CRC parity bit added to the DCI with a predetermined RNTI and identifies whether or not the CRC is correct. In a case in which the CRC is correct, the DCI is understood to be a DCI for the terminal device 2.

The PDSCH is used to transmit downlink data (a downlink shared channel (DL-SCH)). Further, the PDSCH is also used to transmit control information of a higher layer.

The PMCH is used to transmit multicast data (a multicast channel (MCH)).

In the PDCCH region, a plurality of PDCCHs may be multiplexed according to frequency, time, and/or space. In the EPDCCH region, a plurality of EPDCCHs may be multiplexed according to frequency, time, and/or space. In the PDSCH region, a plurality of PDSCHs may be multiplexed according to frequency, time, and/or space. The PDCCH, the PDSCH, and/or the EPDCCH may be multiplexed according to frequency, time, and/or space.

Downlink Physical Signal in Present Embodiment

The PDSCH is transmitted through an antenna port used for transmission of the CRS or the URS on the basis of the transmission mode and the DCI format. A DCI format 1A is used for scheduling of the PD
SCH transmitted through an antenna port used for transmission of the CRS. A DCI format 2D is used for scheduling of the PDSCH transmitted through an antenna port used for transmission of the URS.

The DMRS associated with the EPDCCH is transmitted through a sub frame and a band used for transmission of the EPDCCH to which the DMRS is associated. The DMRS is used for demodulation of the EPDCCH with which the DMRS is associated. The EPDCCH is transmitted through an antenna port used for transmission of the DMRS. The DMRS associated with the EPDCCH is transmitted through one or more of the antenna ports 107 to 114.

Uplink Physical Signal in Present Embodiment

The PUCCH is a physical channel used for transmitting uplink control information (UCI). The uplink control information includes downlink channel state information (CSI), a scheduling request (SR) indicating a request for PUSCH resources, and a HARQ-ACK to downlink data (a transport block (TB) or a downlink-shared channel (DL-SCH)). The HARQ-ACK is also referred to as ACK/NACK, HARQ feedback, or response information. Further, the HARQ-ACK to downlink data indicates ACK, NACK, or DTX.

The PUSCH is a physical channel used for transmitting uplink data (uplink-shared channel (UL-SCH)). Further, the PUSCH may be used to transmit the HARQ-ACK and/or the channel state information together with uplink data. Further, the PUSCH may be used to transmit only the channel state information or only the HARQ-ACK and the channel state information.

The PRACH is a physical channel used for transmitting a random access preamble. The PRACH can be used for the terminal device 2 to obtain synchronization in the time domain with the base station device 1. Further, the PRACH is also used to indicate an initial connection establishment procedure (process), a handover procedure, a connection re-establishment procedure, synchronization (timing adjustment) for uplink transmission, and/or a request for PUSCH resources.

In the PUCCH region, a plurality of PUCCHs is frequency, time, space, and/or code multiplexed. In the PUSCH region, a plurality of PUSCHs may be frequency, time, space, and/or code multiplexed. The PUCCH and the PUSCH may be frequency, time, space, and/or code multiplexed. The PRACH may be placed over a single sub frame or two sub frames. A plurality of PRACHs may be code-multiplexed.

Physical Resources for Control Channel in Present Embodiment

A resource element group (REG) is used to define mapping of the resource element and the control channel. For example, the REG is used for mapping of the PDCCH, the PICH, or the PCFICH. The REG is constituted by four consecutive resource elements which are in the same OFDM symbol and not used for the CRS in the same resource block. Further, the REG is constituted by first to fourth OFDM symbols in a first slot in a certain sub frame.

An enhanced resource element group (EREG) is used to define mapping of the resource elements and the enhanced control channel. For example, the EREG is used for mapping of the EPDCCH. One resource block pair is constituted by 16 EREGs. Each EREG is assigned the number of 0 to 15 for each resource block pair. Each EREG is constituted by 9 resource elements excluding resource elements used for the DM-RS associated with the EPDCCH in one resource block pair.

Configuration Example of Base Station Device 1 in Present Embodiment

Figure 8:
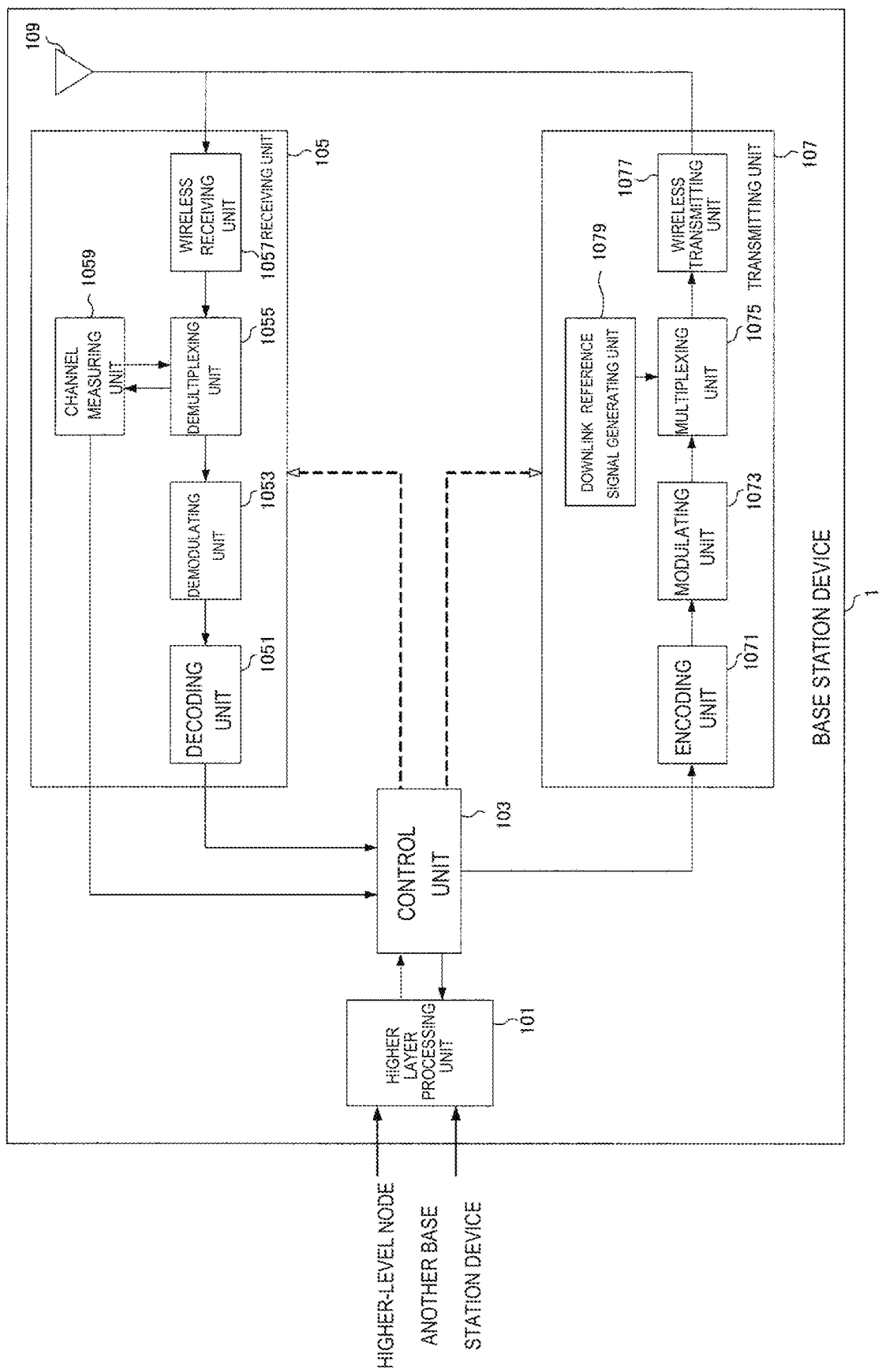
FIG. 8 is a schematic block diagram illustrating a configuration of a base station device of the present embodiment.

FIG. 8 is a schematic block diagram illustrating a configuration of the base station device 1 of the present embodiment. As illustrated in FIG. 3, the base station device 1 includes a higher layer processing unit 101, a control unit 103, a receiving unit 105, a transmitting unit 107, and a transceiving antenna 109. Further, the receiving unit 105 includes a decoding unit 1051, a demodulating unit 1053, a demultiplexing unit 1055, a wireless receiving unit 1057, and a channel measuring unit 1059. Further, the transmitting unit 107 includes an encoding unit 1071, a modulating unit 1073, a multiplexing unit 1075, a wireless transmitting unit 1077, and a downlink reference signal generating unit 1079.

As described above, the base station device 1 can support one or more RATs. Some or all of the units included in the base station device 1 illustrated in FIG. 8 can be configured individually in accordance with the RAT. For example, the receiving unit 105 and the transmitting unit 107 are configured individually in LTE and NR. Further, in the NR cell, some or all of the units included in the base station device 1 illustrated in FIG. 8 can be configured individually in accordance with a parameter set related to the transmission signal. For example, in a certain NR cell, the wireless receiving unit 1057 and the wireless transmitting unit 1077 can be configured individually in accordance with a parameter set related to the transmission signal.

The higher layer processing unit 101 performs processes of a medium access control (MAC) layer, a packet data convergence protocol (PDCP) layer, a radio link control (RLC) layer, and a radio resource control (RRC) layer. Further, the higher layer processing unit 101 generates control information to control the receiving unit 105 and the transmitting unit 107 and outputs the control information to the control unit 103.

The control unit 103 controls the receiving unit 105 and the transmitting unit 107 on the basis of the control information from the higher layer processing unit 101. The control unit 103 generates control information to be transmitted to the higher layer processing unit 101 and outputs the control information to the higher layer processing unit 101. The control unit 103 receives a decoded signal from the decoding unit 1051 and a channel estimation result from the channel measuring unit 1059. The control unit 103 outputs a signal to be encoded to the encoding unit 1071. Further, the control unit 103 is used to control the whole or a part of the base station device 1.

The higher layer processing unit 101 performs a process and management related to RAT control, radio resource control, sub frame setting, scheduling control, and/or CSI report control. The process and the management in the higher layer processing unit 101 are performed for each terminal device or in common to terminal devices connected to the base station device. The process and the management in the higher layer processing unit 101 may be performed only by the higher layer processing unit 101 or may be acquired from a higher node or another base station device. Further, the process and the management in the higher layer processing unit 101 may be individually performed in accordance with the RAT. For example, the higher layer processing unit 101 individually performs the process and the management in LTE and the process and the management in NR.

Under the RAT control of the higher layer processing unit 101, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 101, generation and/or management of downlink data (transport block), system information, an RRC message (RRC parameter), and/or a MAC control element (CE) are performed.

In a sub frame setting in the higher layer processing unit 101, management of a sub frame setting, a sub frame pattern setting, an uplink-downlink setting, an uplink reference UL-DL setting, and/or a downlink reference UL-DL setting is performed. Further, the sub frame setting in the higher layer processing unit 101 is also referred to as a base station sub frame setting. Further, the sub frame setting in the higher layer processing unit 101 can be decided on the basis of an uplink traffic volume and a downlink traffic volume. Further, the sub frame setting in the higher layer processing unit 101 can be decided on the basis of a scheduling result of scheduling control in the higher layer processing unit 101.

In the scheduling control in the higher layer processing unit 101, a frequency and a sub frame to which the physical channel is allocated, a coding rate, a modulation scheme, and transmission power of the physical channels, and the like are decided on the basis of the received channel state information, an estimation value, a channel quality, or the like of a propagation path input from the channel measuring unit 1059, and the like. For example, the control unit 103 generates the control information (DCI format) on the basis of the scheduling result of the scheduling control in the higher layer processing unit 101.

In the CSI report control in the higher layer processing unit 101, the CSI report of the terminal device 2 is controlled. For example, a setting related to the CSI reference resources assumed to calculate the CSI in the terminal device 2 is controlled.

Under the control from the control unit 103, the receiving unit 105 receives a signal transmitted from the terminal device 2 via the transceiving antenna 109, performs a reception process such as demultiplexing, demodulation, and decoding, and outputs information which has undergone the reception process to the control unit 103. Further, the reception process in the receiving unit 105 is performed on the basis of a setting which is specified in advance or a setting notified from the base station device 1 to the terminal device 2.

The wireless receiving unit 1057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 109.

Further, in the present embodiment, the wireless receiving unit 1057 can support a plurality of uplink signal waveforms. The details will be described later.

The demultiplexing unit 1055 separates the uplink channel such as the PUCCH or the PUSCH and/or uplink reference signal from the signal input from the wireless receiving unit 1057. The demultiplexing unit 1055 outputs the uplink reference signal to the channel measuring unit 1059. The demultiplexing unit 1055 compensates the propagation path for the uplink channel from the estimation value of the propagation path input from the channel measuring unit 1059.

The demodulating unit 1053 demodulates the reception signal for the modulation symbol of the uplink channel using a modulation scheme such as binary phase shift keying (BPSK), quadrature phase shift keying (QPSK), 16 quadrature amplitude modulation (QAM), 64 QAM, or 256 QAM. The demodulating unit 1053 performs separation and demodulation of a MIMO multiplexed uplink channel.

The decoding unit 1051 performs a decoding process on encoded bits of the demodulated uplink channel. The decoded uplink data and/or uplink control information are output to the control unit 103. The decoding unit 1051 performs a decoding process on the PUSCH for each transport block.

The channel measuring unit 1059 measures the estimation value, a channel quality, and/or the like of the propagation path from the uplink reference signal input from the demultiplexing unit 1055, and outputs the estimation value, a channel quality, and/or the like of the propagation path to the demultiplexing unit 1055 and/or the control unit 103. For example, the estimation value of the propagation path for propagation path compensation for the PUCCH or the PUSCH is measured by the channel measuring unit 1059 using the UL-DMRS, and an uplink channel quality is measured using the SRS.

The transmitting unit 107 carries out a transmission process such as encoding, modulation, and multiplexing on downlink control information and downlink data input from the higher layer processing unit 101 under the control of the control unit 103. For example, the transmitting unit 107 generates and multiplexes the PHICH, the PDCCH, the EPDCCH, the PDSCH, and the downlink reference signal and generates a transmission signal. Further, the transmission process in the transmitting unit 107 is performed on the basis of a setting which is specified in advance, a setting notified from the base station device 1 to the terminal device 2, or a setting notified through the PDCCH or the EPDCCH transmitted through the same sub frame.

The encoding unit 1071 encodes the HARQ indicator (HARQ-ACK), the downlink control information, and the downlink data input from the control unit 103 using a predetermined coding scheme such as block coding, convolutional coding, turbo coding, or the like. The modulating unit 1073 modulates the encoded bits input from the encoding unit 1071 using a predetermined modulation scheme such as BPSK, QPSK, 16 QAM, 64 QAM, or 256 QAM. The downlink reference signal generating unit 1079 generates the downlink reference signal on the basis of a physical cell identification (PCI), an RRC parameter set in the terminal device 2, and the like. The multiplexing unit 1075 multiplexes a modulated symbol and the downlink reference signal of each channel and arranges resulting data in a predetermined resource element.

The wireless transmitting unit 1077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 1075, and generates a transmission signal. The transmission signal output from the wireless transmitting unit 1077 is transmitted through the transceiving antenna 109.

Configuration Example of Terminal Device 2 in Present Embodiment

Figure 9:
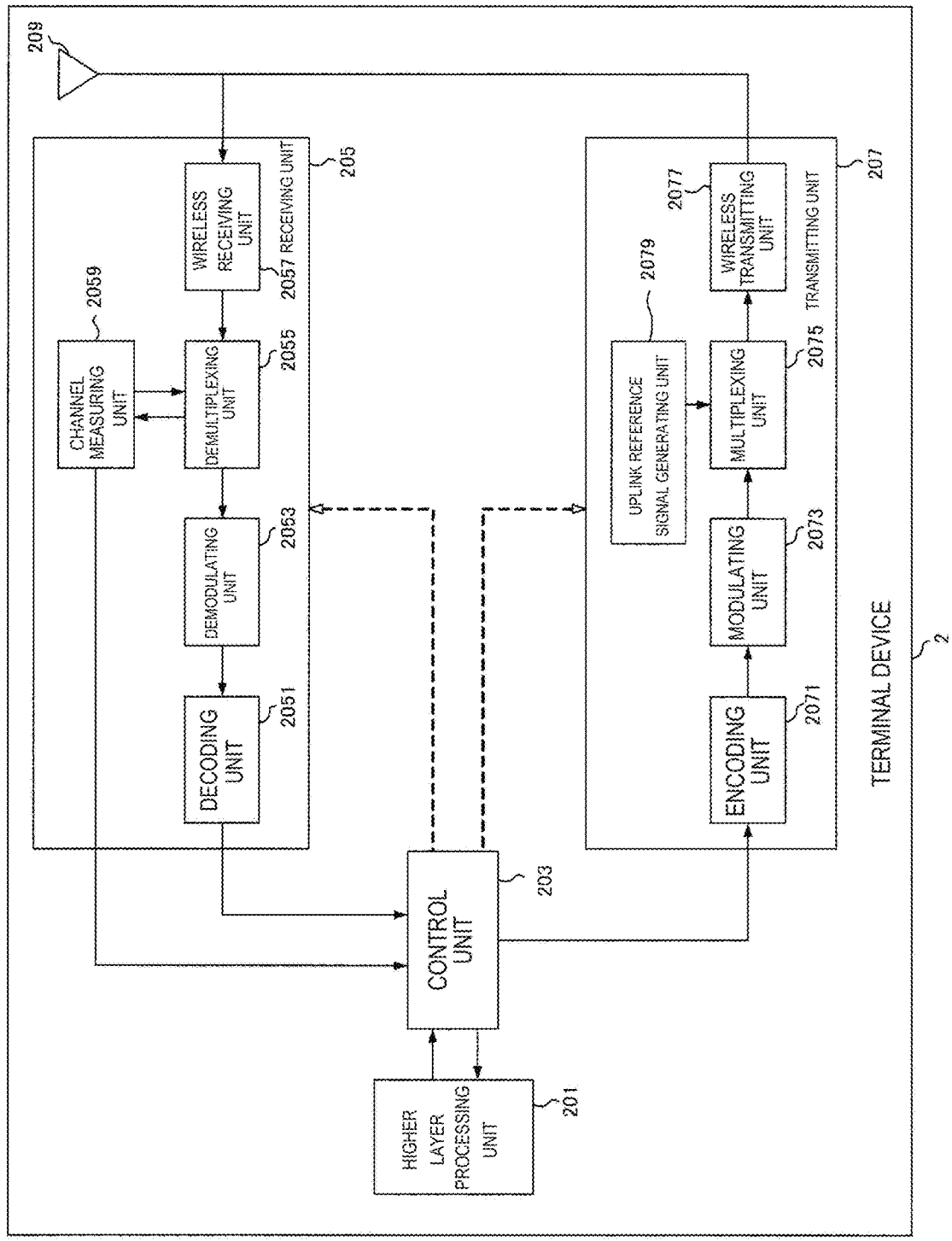
FIG. 9 is a schematic block diagram illustrating a configuration of a terminal device of the present embodiment.

FIG. 9 is a schematic block diagram illustrating a configuration of the terminal device 2 of the present embodiment. As illustrated in FIG. 4, the terminal device 2 includes a higher layer processing unit 201, a control unit 203, a receiving unit 205, a transmitting unit 207, and a transceiving antenna 209. Further, the receiving unit 205 includes a decoding unit 2051, a demodulating unit 2053, a demultiplexing unit 2055, a wireless receiving unit 2057, and a channel measuring unit 2059. Further, the transmitting unit 207 includes an encoding unit 2071, a modulating unit 2073, a multiplexing unit 2075, a wireless transmitting unit 2077, and an uplink reference signal generating unit 2079.

As described above, the terminal device 2 can support one or more RATs. Some or all of the units included in the terminal device 2 illustrated in FIG. 9 can be configured individually in accordance with the RAT. For example, the receiving unit 205 and the transmitting unit 207 are configured individually in LTE and NR. Further, in the NR cell, some or all of the units included in the terminal device 2 illustrated in FIG. 9 can be configured individually in accordance with a parameter set related to the transmission signal. For example, in a certain NR cell, the wireless receiving unit 2057 and the wireless transmitting unit 2077 can be configured individually in accordance with a parameter set related to the transmission signal.

The higher layer processing unit 201 outputs uplink data (transport block) to the control unit 203. The higher layer processing unit 201 performs processes of a medium access control (MAC) layer, a packet data convergence protocol (PDCP) layer, a radio link control (RLC) layer, and a radio resource control (RRC) layer. Further, the higher layer processing unit 201 generates control information to control the receiving unit 205 and the transmitting unit 207 and outputs the control information to the control unit 203.

The control unit 203 controls the receiving unit 205 and the transmitting unit 207 on the basis of the control information from the higher layer processing unit 201. The control unit 203 generates control information to be transmitted to the higher layer processing unit 201 and outputs the control information to the higher layer processing unit 201. The control unit 203 receives a decoded signal from the decoding unit 2051 and a channel estimation result from the channel measuring unit 2059. The control unit 203 outputs a signal to be encoded to the encoding unit 2071. Further, the control unit 203 may be used to control the whole or a part of the terminal device 2.

The higher layer processing unit 201 performs a process and management related to RAT control, radio resource control, sub frame setting, scheduling control, and/or CSI report control. The process and the management in the higher layer processing unit 201 are performed on the basis of a setting which is specified in advance and/or a setting based on control information set or notified from the base station device 1. For example, the control information from the base station device 1 includes the RRC parameter, the MAC control element, or the DCI. Further, the process and the management in the higher layer processing unit 201 may be individually performed in accordance with the RAT. For example, the higher layer processing unit 201 individually performs the process and the management in LTE and the process and the management in NR.

Under the RAT control of the higher layer processing unit 201, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 201, the setting information in the terminal device 2 is managed. In the radio resource control in the higher layer processing unit 201, generation and/or management of uplink data (transport block), system information, an RRC message (RRC parameter), and/or a MAC control element (CE) are performed.

In the sub frame setting in the higher layer processing unit 201, the sub frame setting in the base station device 1 and/or a base station device different from the base station device 1 is managed. The sub frame setting includes an uplink or downlink setting for the sub frame, a sub frame pattern setting, an uplink-downlink setting, an uplink reference UL-DL setting, and/or a downlink reference UL-DL setting. Further, the sub frame setting in the higher layer processing unit 201 is also referred to as a terminal sub frame setting.

In the scheduling control in the higher layer processing unit 201, control information for controlling scheduling on the receiving unit 205 and the transmitting unit 207 is generated on the basis of the DCI (scheduling information) from the base station device 1.

In the CSI report control in the higher layer processing unit 201, control related to the report of the CSI to the base station device 1 is performed. For example, in the CSI report control, a setting related to the CSI reference resources assumed for calculating the CSI by the channel measuring unit 2059 is controlled. In the CSI report control, resource (timing) used for reporting the CSI is controlled on the basis of the DCI and/or the RRC parameter.

Under the control from the control unit 203, the receiving unit 205 receives a signal transmitted from the base station device 1 via the transceiving antenna 209, performs a reception process such as demultiplexing, demodulation, and decoding, and outputs information which has undergone the reception process to the control unit 203. Further, the reception process in the receiving unit 205 is performed on the basis of a setting which is specified in advance or a notification from the base station device 1 or a setting.

The wireless receiving unit 2057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 209.

The demultiplexing unit 2055 separates the downlink channel such as the PHICH, PDCCH, EPDCCH, or PDSCH, downlink synchronization signal and/or downlink reference signal from the signal input from the wireless receiving unit 2057. The demultiplexing unit 2055 outputs the uplink reference signal to the channel measuring unit 2059. The demultiplexing unit 2055 compensates the propagation path for the uplink channel from the estimation value of the propagation path input from the channel measuring unit 2059.

The demodulating unit 2053 demodulates the reception signal for the modulation symbol of the downlink channel using a modulation scheme such as BPSK, QPSK, 16 QAM, 64 QAM, or 256 QAM. The demodulating unit 2053 performs separation and demodulation of a MIMO multiplexed downlink channel.

The decoding unit 2051 performs a decoding process on encoded bits of the demodulated downlink channel. The decoded downlink data and/or downlink control information are output to the control unit 203. The decoding unit 2051 performs a decoding process on the PDSCH for each transport block.

The channel measuring unit 2059 measures the estimation value, a channel quality, and/or the like of the propagation path from the downlink reference signal input from the demultiplexing unit 2055, and outputs the estimation value, a channel quality, and/or the like of the propagation path to the demultiplexing unit 2055 and/or the control unit 203. The downlink reference signal used for measurement by the channel measuring unit 2059 may be decided on the basis of at least a transmission mode set by the RRC parameter and/or other RRC parameters. For example, the estimation value of the propagation path for performing the propagation path compensation on the PDSCH or the EPDCCH is measured through the DL-DMRS. The estimation value of the propagation path for performing the propagation path compensation on the PDCCH or the PDSCH and/or the downlink channel for reporting the CSI are measured through the CRS. The downlink channel for reporting the CSI is measured through the CSI-RS. The channel measuring unit 2059 calculates a reference signal received power (RSRP) and/or a reference signal received quality (RSRQ) on the basis of the CRS, the CSI-RS, or the discovery signal, and outputs the RSRP and/or the RSRQ to the higher layer processing unit 201.

The transmitting unit 207 performs a transmission process such as encoding, modulation, and multiplexing on the uplink control information and the uplink data input from the higher layer processing unit 201 under the control of the control unit 203. For example, the transmitting unit 207 generates and multiplexes the uplink channel such as the PUSCH or the PUCCH and/or the uplink reference signal, and generates a transmission signal. Further, the transmission process in the transmitting unit 207 is performed on the basis of a setting which is specified in advance or a setting set or notified from the base station device 1.

The encoding unit 2071 encodes the HARQ indicator (HARQ-ACK), the uplink control information, and the uplink data input from the control unit 203 using a predetermined coding scheme such as block coding, convolutional coding, turbo coding, or the like. The modulating unit 2073 modulates the encoded bits input from the encoding unit 2071 using a predetermined modulation scheme such as BPSK, QPSK, 16 QAM, 64 QAM, or 256 QAM. The uplink reference signal generating unit 2079 generates the uplink reference signal on the basis of an RRC parameter set in the terminal device 2, and the like. The multiplexing unit 2075 multiplexes a modulated symbol and the uplink reference signal of each channel and arranges resulting data in a predetermined resource element.

The wireless transmitting unit 2077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 2075, and generates a transmission signal. The transmission signal output from the wireless transmitting unit 2077 is transmitted through the transceiving antenna 209.

Further, in the present embodiment, the wireless transmitting unit 2077 can support a plurality of uplink signal waveforms. The details thereof will be described later.

Signaling of Control Information in Present Embodiment

The base station device 1 and the terminal device 2 can use various methods for signaling (notification, broadcasting, or setting) of the control information. The signaling of the control information can be performed in various layers (layers). The signaling of the control information includes signaling of the physical layer which is signaling performed through the physical layer, RRC signaling which is signaling performed through the RRC layer, and MAC signaling which is signaling performed through the MAC layer. The RRC signaling is dedicated RRC signaling for notifying the terminal device 2 of the control information specific or a common RRC signaling for notifying of the control information specific to the base station device 1. The signaling used by a layer higher than the physical layer such as RRC signaling and MAC signaling is referred to as signaling of the higher layer.

The RRC signaling is implemented by signaling the RRC parameter. The MAC signaling is implemented by signaling the MAC control element. The signaling of the physical layer is implemented by signaling the downlink control information (DCI) or the uplink control information (UCI). The RRC parameter and the MAC control element are transmitted using the PDSCH or the PUSCH. The DCI is transmitted using the PDCCH or the EPDCCH. The UCI is transmitted using the PUCCH or the PUSCH. The RRC signaling and the MAC signaling are used for signaling semi-static control information and are also referred to as semi-static signaling. The signaling of the physical layer is used for signaling dynamic control information and also referred to as dynamic signaling. The DCI is used for scheduling of the PDSCH or scheduling of the PUSCH. The UCI is used for the CSI report, the HARQ-ACK report, and/or the scheduling request (SR).

Details of Downlink Control Information in Present Embodiment

The DCI is notified using the DCI format having a field which is specified in advance. Predetermined information bits are mapped to the field specified in the DCI format. The DCI notifies of downlink scheduling information, uplink scheduling information, sidelink scheduling information, a request for a non-periodic CSI report, or an uplink transmission power command.

The DCI format monitored by the terminal device 2 is decided in accordance with the transmission mode set for each serving cell. In other words, a part of the DCI format monitored by the terminal device 2 can differ depending on the transmission mode. For example, the terminal device 2 in which a downlink transmission mode 1 is set monitors the DCI format 1A and the DCI format 1. For example, the terminal device 2 in which a downlink transmission mode 4 is set monitors the DCI format 1A and the DCI format 2. For example, the terminal device 2 in which an uplink transmission mode 1 is set monitors the DCI format 0. For example, the terminal device 2 in which an uplink transmission mode 2 is set monitors the DCI format 0 and the DCI format 4.

A control region in which the PDCCH for notifying the terminal device 2 of the DCI is placed is not notified, and the terminal device 2 detects the DCI for the terminal device 2 through blind decoding (blind detection). Specifically, the terminal device 2 monitors a set of PDCCH candidates in the serving cell. The monitoring indicates that decoding is attempted in accordance with all the DCI formats to be monitored for each of the PDCCHs in the set. For example, the terminal device 2 attempts to decode all aggregation levels, PDCCH candidates, and DCI formats which are likely to be transmitted to the terminal device 2. The terminal device 2 recognizes the DCI (PDCCH) which is successfully decoded (detected) as the DCI (PDCCH) for the terminal device 2.

A cyclic redundancy check (CRC) is added to the DCI. The CRC is used for the DCI error detection and the DCI blind detection. A CRC parity bit (CRC) is scrambled using the RNTI. The terminal device 2 detects whether or not it is a DCI for the terminal device 2 on the basis of the RNTI. Specifically, the terminal device 2 performs de-scrambling on the bit corresponding to the CRC using a predetermined RNTI, extracts the CRC, and detects whether or not the corresponding DCI is correct.

The RNTI is specified or set in accordance with a purpose or a use of the DCI. The RNTI includes a cell-RNTI (C-RNTI), a semi persistent scheduling C-RNTI (SPS C-RNTI), a system information-RNTI (SI-RNTI), a paging-RNTI (P-RNTI), a random access-RNTI (RA-RNTI), a transmit power control-PUCCH-RNTI (TPC-PUCCH-RNTI), a transmit power control-PUSCH-RNTI (TPC-PUSCH-RNTI), a temporary C-RNTI, a multimedia broadcast multicast services (MBMS)-RNTI (M-RNTI)), an eIMTA-RNTI and a CC-RNTI.

The C-RNTI and the SPS C-RNTI are RNTIs which are specific to the terminal device 2 in the base station device 1 (cell), and serve as identifiers identifying the terminal device 2. The C-RNTI is used for scheduling the PDSCH or the PUSCH in a certain sub frame. The SPS C-RNTI is used to activate or release periodic scheduling of resources for the PDSCH or the PUSCH. A control channel having a CRC scrambled using the SI-RNTI is used for scheduling a system information block (SIB). A control channel with a CRC scrambled using the P-RNTI is used for controlling paging. A control channel with a CRC scrambled using the RA-RNTI is used for scheduling a response to the RACH. A control channel having a CRC scrambled using the TPC-PUCCH-RNTI is used for power control of the PUCCH. A control channel having a CRC scrambled using the TPC-PUSCH-RNTI is used for power control of the PUSCH. A control channel with a CRC scrambled using the temporary C-RNTI is used by a mobile station device in which no C-RNTI is set or recognized. A control channel with CRC scrambled using the M-RNTI is used for scheduling the MBMS. A control channel with a CRC scrambled using the eIMTA-RNTI is used for notifying of information related to a TDD UL/DL setting of a TDD serving cell in dynamic TDD (eIMTA). The control channel (DCI) with a CRC scrambled using the CC-RNTI is used to notify of setting of an exclusive OFDM symbol in the LAA secondary cell. Further, the DCI format may be scrambled using a new RNTI instead of the above RNTI.

Scheduling information (the downlink scheduling information, the uplink scheduling information, and the sidelink scheduling information) includes information for scheduling in units of resource blocks or resource block groups as the scheduling of the frequency region. The resource block group is successive resource block sets and indicates resources allocated to the scheduled terminal device. A size of the resource block group is decided in accordance with a system bandwidth.

Details of Downlink Control Channel in Present Embodiment

The DCI is transmitted using a control channel such as the PDCCH or the EPDCCH. The terminal device 2 monitors a set of PDCCH candidates and/or a set of EPDCCH candidates of one or more activated serving cells set by RRC signaling. Here, the monitoring means that the PDCCH and/or the EPDCCH in the set corresponding to all the DCI formats to be monitored is attempted to be decoded.

A set of PDCCH candidates or a set of EPDCCH candidates is also referred to as a search space. In the search space, a shared search space (CSS) and a terminal specific search space (USS) are defined. The CSS may be defined only for the search space for the PDCCH.

A common search space (CSS) is a search space set on the basis of a parameter specific to the base station device 1 and/or a parameter which is specified in advance. For example, the CSS is a search space used in common to a plurality of terminal devices. Therefore, the base station device 1 maps a control channel common to a plurality of terminal devices to the CSS, and thus resources for transmitting the control channel are reduced.

A UE-specific search space (USS) is a search space set using at least a parameter specific to the terminal device 2. Therefore, the USS is a search space specific to the terminal device 2, and it is possible for the base station device 1 to individually transmit the control channel specific to the terminal device 2 by using the USS. For this reason, the base station device 1 can efficiently map the control channels specific to a plurality of terminal devices.

The USS may be set to be used in common to a plurality of terminal devices. Since a common USS is set in a plurality of terminal devices, a parameter specific to the terminal device 2 is set to be the same value among a plurality of terminal devices. For example, a unit set to the same parameter among a plurality of terminal devices is a cell, a transmission point, a group of predetermined terminal devices, or the like.

The search space of each aggregation level is defined by a set of PDCCH candidates. Each PDCCH is transmitted using one or more CCE sets. The number of CCEs used in one PDCCH is also referred to as an aggregation level. For example, the number of CCEs used in one PDCCH is 1, 2, 4, or 8.

The search space of each aggregation level is defined by a set of EPDCCH candidates. Each EPDCCH is transmitted using one or more enhanced control channel element (ECCE) sets. The number of ECCEs used in one EPDCCH is also referred to as an aggregation level. For example, the number of ECCEs used in one EPDCCH is 1, 2, 4, 8, 16, or 32.

The number of PDCCH candidates or the number of EPDCCH candidates is decided on the basis of at least the search space and the aggregation level. For example, in the CSS, the number of PDCCH candidates in the aggregation levels 4 and 8 are 4 and 2, respectively. For example, in the USS, the number of PDCCH candidates in the aggregations 1, 2, 4, and 8 are 6, 6, 2, and 2, respectively.

Each ECCE includes a plurality of EREGs. The EREG is used to define mapping to the resource element of the EPDCCH. 16 EREGs which are assigned numbers of 0 to 15 are defined in each RB pair. In other words, an EREG 0 to an EREG 15 are defined in each RB pair. For each RB pair, the EREG 0 to the EREG 15 are preferentially defined at regular intervals in the frequency direction for resource elements other than resource elements to which a predetermined signal and/or channel is mapped. For example, a resource element to which a demodulation reference signal associated with an EPDCCH transmitted through antenna ports 107 to 110 is mapped is not defined as the EREG.

The number of ECCEs used in one EPDCCH depends on an EPDCCH format and is decided on the basis of other parameters. The number of ECCEs used in one EPDCCH is also referred to as an aggregation level. For example, the number of ECCEs used in one EPDCCH is decided on the basis of the number of resource elements which can be used for transmission of the EPDCCH in one RB pair, a transmission method of the EPDCCH, and the like. For example, the number of ECCEs used in one EPDCCH is 1, 2, 4, 8, 16, or 32. Further, the number of EREGs used in one ECCE is decided on the basis of a type of sub frame and a type of cyclic prefix and is 4 or 8. Distributed transmission and localized transmission are supported as the transmission method of the EPDCCH.

The distributed transmission or the localized transmission can be used for the EPDCCH. The distributed transmission and the localized transmission differ in mapping of the ECCE to the EREG and the RB pair. For example, in the distributed transmission, one ECCE is configured using EREGs of a plurality of RB pairs. In the localized transmission, one ECCE is configured using an EREG of one RB pair.

The base station device 1 performs a setting related to the EPDCCH in the terminal device 2. The terminal device 2 monitors a plurality of EPDCCHs on the basis of the setting from the base station device 1. A set of RB pairs that the terminal device 2 monitors the EPDCCH can be set. The set of RB pairs is also referred to as an EPDCCH set or an EPDCCH-PRB set. One or more EPDCCH sets can be set in one terminal device 2. Each EPDCCH set includes one or more RB pairs. Further, the setting related to the EPDCCH can be individually performed for each EPDCCH set.

The base station device 1 can set a predetermined number of EPDCCH sets in the terminal device 2. For example, up to two EPDCCH sets can be set as an EPDCCH set 0 and/or an EPDCCH set 1. Each of the EPDCCH sets can be constituted by a predetermined number of RB pairs. Each EPDCCH set constitutes one set of ECCEs. The number of ECCEs configured in one EPDCCH set is decided on the basis of the number of RB pairs set as the EPDCCH set and the number of EREGs used in one ECCE. In a case in which the number of ECCEs configured in one EPDCCH set is N, each EPDCCH set constitutes ECCEs 0 to N-1. For example, in a case in which the number of EREGs used in one ECCE is 4, the EPDCCH set constituted by 4 RB pairs constitutes 16 ECCEs.

Details of CA and DC in Present Embodiment

A plurality of cells is set for the terminal device 2, and the terminal device 2 can perform multicarrier transmission. Communication in which the terminal device 2 uses a plurality of cells is referred to as carrier aggregation (CA) or dual connectivity (DC). Contents described in the present embodiment can be applied to each or some of a plurality of cells set in the terminal device 2. The cell set in the terminal device 2 is also referred to as a serving cell.

In the CA, a plurality of serving cells to be set includes one primary cell (PCell) and one or more secondary cells (SCell). One primary cell and one or more secondary cells can be set in the terminal device 2 that supports the CA.

The primary cell is a serving cell in which the initial connection establishment procedure is performed, a serving cell that the initial connection re-establishment procedure is started, or a cell indicated as the primary cell in a handover procedure. The primary cell operates with a primary frequency. The secondary cell can be set after a connection is constructed or reconstructed. The secondary cell operates with a secondary frequency. Further, the connection is also referred to as an RRC connection.

The DC is an operation in which a predetermined terminal device 2 consumes radio resources provided from at least two different network points. The network point is a master base station device (a master eNB (MeNB)) and a secondary base station device (a secondary eNB (SeNB)). In the dual connectivity, the terminal device 2 establishes an RRC connection through at least two network points. In the dual connectivity, the two network points may be connected through a non-ideal backhaul.

In the DC, the base station device 1 which is connected to at least an S1-MME and plays a role of a mobility anchor of a core network is referred to as a master base station device. Further, the base station device 1 which is not the master base station device providing additional radio resources to the terminal device 2 is referred to as a secondary base station device. A group of serving cells associated with the master base station device is also referred to as a master cell group (MCG). A group of serving cells associated with the secondary base station device is also referred to as a secondary cell group (SCG). Note that the group of the serving cells is also referred to as a cell group (CG).

In the DC, the primary cell belongs to the MCG. Further, in the SCG, the secondary cell corresponding to the primary cell is referred to as a primary secondary cell (PSCell). A function (capability and performance) equivalent to the PCell (the base station device constituting the PCell) may be supported by the PSCell (the base station device constituting the PSCell). Further, the PSCell may only support some functions of the PCell. For example, the PSCell may support a function of performing the PDCCH transmission using the search space different from the CSS or the USS. Further, the PSCell may constantly be in an activation state. Further, the PSCell is a cell that can receive the PUCCH.

In the DC, a radio bearer (a date radio bearer (DRB)) and/or a signaling radio bearer (SRB) may be individually allocated through the MeNB and the SeNB. A duplex mode may be set individually in each of the MCG (PCell) and the SCG (PSCell). The MCG (PCell) and the SCG (PSCell) may not be synchronized with each other. That is, a frame boundary of the MCG and a frame boundary of the SCG may not be matched. A parameter (a timing advance group (TAG)) for adjusting a plurality of timings may be independently set in the MCG (PCell) and the SCG (PSCell). In the dual connectivity, the terminal device 2 transmits the UCI corresponding to the cell in the MCG only through MeNB (PCell) and transmits the UCI corresponding to the cell in the SCG only through SeNB (pSCell). In the transmission of each UCI, the transmission method using the PUCCH and/or the PUSCH is applied in each cell group.

The PUCCH and the PBCH (MIB) are transmitted only through the PCell or the PSCell. Further, the PRACH is transmitted only through the PCell or the PSCell as long as a plurality of TAGs are not set between cells in the CG.

In the PCell or the PSCell, semi-persistent scheduling (SPS) or discontinuous transmission (DRX) may be performed. In the secondary cell, the same DRX as the PCell or the PSCell in the same cell group may be performed.

In the secondary cell, information/parameter related to a setting of MAC is basically shared with the PCell or the PSCell in the same cell group. Some parameters may be set for each secondary cell. Some timers or counters may be applied only to the PCell or the PSCell.

In the CA, a cell to which the TDD scheme is applied and a cell to which the FDD scheme is applied may be aggregated. In a case in which the cell to which the TDD is applied and the cell to which the FDD is applied are aggregated, the present disclosure can be applied to either the cell to which the TDD is applied or the cell to which the FDD is applied.

The terminal device 2 transmits information (supportedBandCombination) indicating a combination of bands in which the CA and/or DC is supported by the terminal device 2 to the base station device 1. The terminal device 2 transmits information indicating whether or not simultaneous transmission and reception are supported in a plurality of serving cells in a plurality of different bands for each of band combinations to the base station device 1.

Details of Resource Allocation in Present Embodiment

The base station device 1 can use a plurality of methods as a method of allocating resources of the PDSCH and/or the PUSCH to the terminal device 2. The resource allocation method includes dynamic scheduling, semi persistent scheduling, multi sub frame scheduling, and cross sub frame scheduling.

In the dynamic scheduling, one DCI performs resource allocation in one sub frame. Specifically, the PDCCH or the EPDCCH in a certain sub frame performs scheduling for the PDSCH in the sub frame. The PDCCH or the EPDCCH in a certain sub frame performs scheduling for the PUSCH in a predetermined sub frame after the certain sub frame.

In the multi sub frame scheduling, one DCI allocates resources in one or more sub frames. Specifically, the PDCCH or the EPDCCH in a certain sub frame performs scheduling for the PDSCH in one or more sub frames which are a predetermined number after the certain sub frame. The PDCCH or the EPDCCH in a certain sub frame performs scheduling for the PUSCH in one or more sub frames which are a predetermined number after the sub frame. The predetermined number can be set to an integer of zero or more. The predetermined number may be specified in advance and may be decided on the basis of the signaling of the physical layer and/or the RRC signaling. In the multi sub frame scheduling, consecutive sub frames may be scheduled, or sub frames with a predetermined period may be scheduled. The number of sub frames to be scheduled may be specified in advance or may be decided on the basis of the signaling of the physical layer and/or the RRC signaling.

In the cross sub frame scheduling, one DCI allocates resources in one sub frame. Specifically, the PDCCH or the EPDCCH in a certain sub frame performs scheduling for the PDSCH in one sub frame which is a predetermined number after the certain sub frame. The PDCCH or the EPDCCH in a certain sub frame performs scheduling for the PUSCH in one sub frame which is a predetermined number after the sub frame. The predetermined number can be set to an integer of zero or more. The predetermined number may be specified in advance and may be decided on the basis of the signaling of the physical layer and/or the RRC signaling. In the cross sub frame scheduling, consecutive sub frames may be scheduled, or sub frames with a predetermined period may be scheduled.

In the semi-persistent scheduling (SPS), one DCI allocates resources in one or more sub frames. In a case in which information related to the SPS is set through the RRC signaling, and the PDCCH or the EPDCCH for activating the SPS is detected, the terminal device 2 activates a process related to the SPS and receives a predetermined PDSCH and/or PUSCH on the basis of a setting related to the SPS. In a case in which the PDCCH or the EPDCCH for releasing the SPS is detected when the SPS is activated, the terminal device 2 releases (inactivates) the SPS and stops reception of a predetermined PDSCH and/or PUSCH. The release of the SPS may be performed on the basis of a case in which a predetermined condition is satisfied. For example, in a case in which a predetermined number of empty transmission data is received, the SPS is released. The data empty transmission for releasing the SPS corresponds to a MAC protocol data unit (PDU) including a zero MAC service data unit (SDU).

Information related to the SPS by the RRC signaling includes an SPS C-RNTI which is an SPN RNTI, information related to a period (interval) in which the PDSCH is scheduled, information related to a period (interval) in which the PUSCH is scheduled, information related to a setting for releasing the SPS, and/or the number of the HARQ process in the SPS. The SPS is supported only in the primary cell and/or the primary secondary cell.

HARQ in Present Embodiment

In the present embodiment, the HARQ has various features. The HARQ transmits and retransmits the transport block. In the HARQ, a predetermined number of processes (HARQ processes) are used (set), and each process independently operates in accordance with a stop-and-wait scheme.

In the downlink, the HARQ is asynchronous and operates adaptively. In other words, in the downlink, retransmission is constantly scheduled through the PDCCH. The uplink HARQ-ACK (response information) corresponding to the downlink transmission is transmitted through the PUCCH or the PUSCH. In the downlink, the PDCCH notifies of a HARQ process number indicating the HARQ process and information indicating whether or not transmission is initial transmission or retransmission.

In the uplink, the HARQ operates in a synchronous or asynchronous manner. The downlink HARQ-ACK (response information) corresponding to the uplink transmission is transmitted through the PHICH. In the uplink HARQ, an operation of the terminal device is decided on the basis of the HARQ feedback received by the terminal device and/or the PDCCH received by the terminal device. For example, in a case in which the PDCCH is not received, and the HARQ feedback is ACK, the terminal device does not perform transmission (retransmission) but holds data in a HARQ buffer. In this case, the PDCCH may be transmitted in order to resume the retransmission. Further, for example, in a case in which the PDCCH is not received, and the HARQ feedback is NACK, the terminal device performs retransmission non-adaptively through a predetermined uplink sub frame. Further, for example, in a case in which the PDCCH is received, the terminal device performs transmission or retransmission on the basis of contents notified through the PDCCH regardless of content of the HARQ feedback.

Further, in the uplink, in a case in which a predetermined condition (setting) is satisfied, the HARQ may be operated only in an asynchronous manner. In other words, the downlink HARQ-ACK is not transmitted, and the uplink retransmission may constantly be scheduled through the PDCCH.

In the HARQ-ACK report, the HARQ-ACK indicates ACK, NACK, or DTX. In a case in which the HARQ-ACK is ACK, it indicates that the transport block (codeword and channel) corresponding to the HARQ-ACK is correctly received (decoded). In a case in which the HARQ-ACK is NACK, it indicates that the transport block (codeword and channel) corresponding to the HARQ-ACK is not correctly received (decoded). In a case in which the HARQ-ACK is DTX, it indicates that the transport block (codeword and channel) corresponding to the HARQ-ACK is not present (not transmitted).

A predetermined number of HARQ processes are set (specified) in each of downlink and uplink. For example, in FDD, up to eight HARQ processes are used for each serving cell. Further, for example, in TDD, a maximum number of HARQ processes is decided by an uplink/downlink setting. A maximum number of HARQ processes may be decided on the basis of a round trip time (RTT). For example, in a case in which the RTT is 8 TTIs, the maximum number of the HARQ processes can be 8.

In the present embodiment, the HARQ information is constituted by at least a new data indicator (NDI) and a transport block size (TBS). The NDI is information indicating whether or not the transport block corresponding to the HARQ information is initial transmission or retransmission. The TBS is the size of the transport block. The transport block is a block of data in a transport channel (transport layer) and can be a unit for performing the HARQ. In the DL-SCH transmission, the HARQ information further includes a HARQ process ID (a HARQ process number). In the UL-SCH transmission, the HARQ information further includes an information bit in which the transport block is encoded and a redundancy version (RV) which is information specifying a parity bit. In the case of spatial multiplexing in the DL-SCH, the HARQ information thereof includes a set of NDI and TBS for each transport block.

Frame Configuration (Time Domain) of NR in the Present Embodiment

A frame configuration of NR can be specified by a sub frame, a slot, and a minislot. A sub frame includes 14 symbols and can be used in the definition of a frame configuration in a reference subcarrier interval (a specified subcarrier interval). A slot is a symbol interval in a subcarrier interval used for communication, and includes 7 or 14 symbols. The number of symbols constituting one slot can be set to be specific to a cell or a terminal device from the base station device 1. A minislot may by constituted by fewer symbols than a slot. For example, the number of symbols of one minislot is from 1 to 6 and can be set to be specific to a cell or a terminal device from the base station device 1. Both a slot and a minislot are used as units of time domain resources for performing communication. For example, a slot is used for communication for an eMBB and an mMTC, and a minislot is used for communication for a URLLC. Further, the names of the slot and the minislot may not be distinguished.

Figure 10:
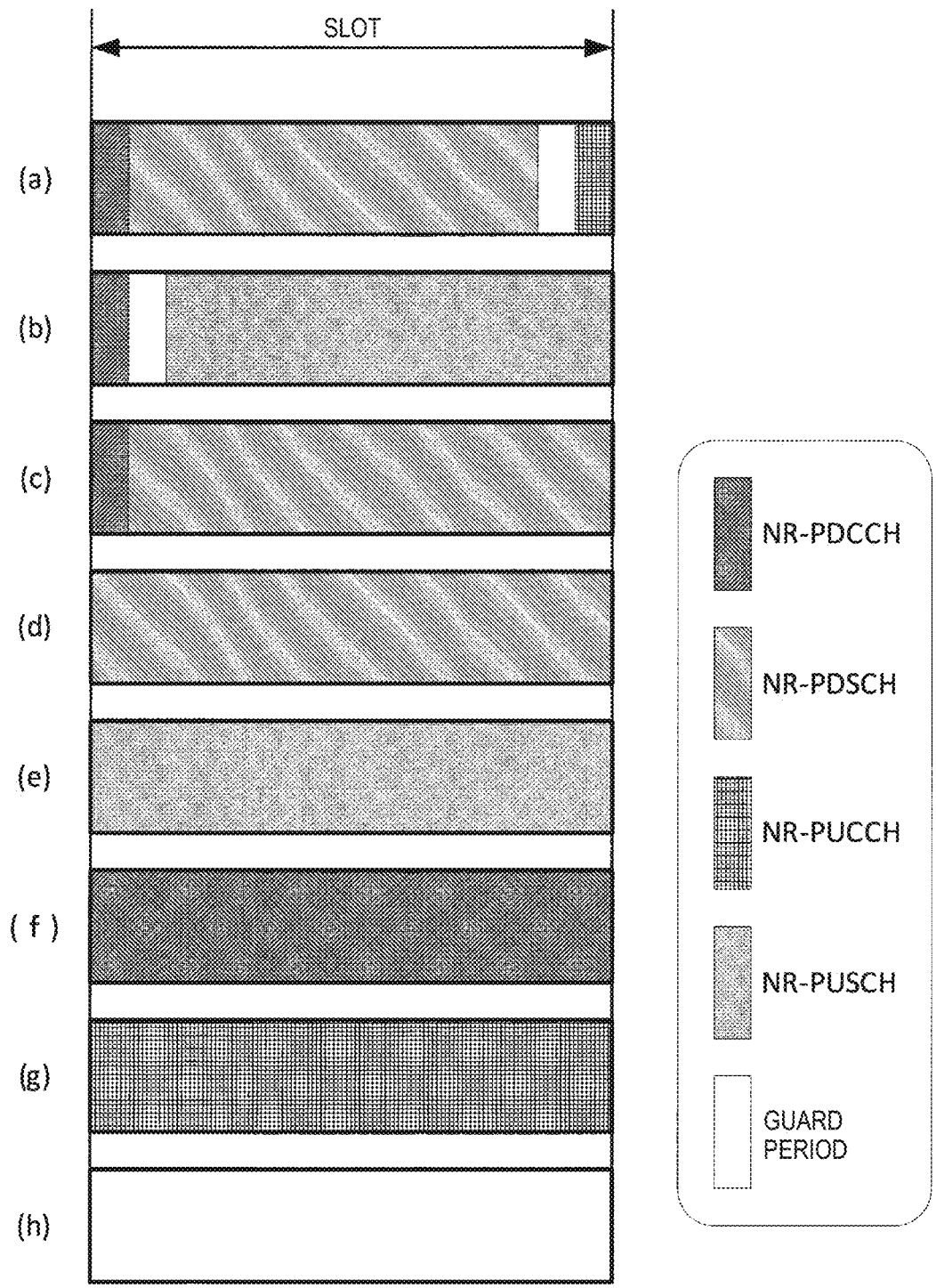
FIG. 10 illustrates an example of an NR frame configuration in the present embodiment.

FIG. 10 illustrates an example of an NR frame configuration in the present embodiment. FIG. 10 illustrates a frame configuration in a predetermined frequency domain. For example, the frequency domain includes a resource block, a sub band, a system bandwidth, or the like. Therefore, the frame configuration illustrated in FIG. 10 can be frequency multiplexed and/or spatially multiplexed.

In NR, one slot includes downlink communication, a guard period (GP), and/or downlink communication. The downlink communication includes a downlink channel such as an NR-PDCCH and/or an NR-PDSCH. Further, the downlink transmission includes a reference signal associated with an NR-PDCCH and/or an NR-PDSCH. The uplink communication includes an uplink channel such as an NR-PUCCH and/or an NR-PUSCH. Further, the downlink communication includes a reference signal associated with an NR-PUCCH and/or an NR-PUSCH. The GP is a time domain in which nothing is transmitted. For example, the GP is used to adjust a time to switch from reception of downlink communication to transmission of uplink communication in the terminal device 2, a processing time in the terminal device 2, and/or a transmission timing of uplink communication.

As illustrated in FIG. 10, NR can use various frame configurations. In (a) of FIG. 10, it includes the NR- PDCCH, the NR-PDSCH, the GP, and the NR-PUCCH. A notification of allocation information of the NR-PDSCH is performed through the NR-PDCCH, and a notification of HARQ-ACK to the received NR-PDSCH is performed through the NR-PUCCH in the same slot. In (b) of FIG. 10, it includes the NR-PDCCH, the GP, and the NR-PUSCH. A notification of allocation information of the NR-PUSCH is performed through the NR-PDCCH, and the NR-PUSCH is transmitted using allocated resources in the same slot. The frame configurations illustrated in (a) and (b) of FIG. 10 are also referred to as self-contained frames since the downlink communication and the uplink communication are completed within the same slot.

(c) to (g) of FIG. 10 illustrate slots including only downlink communication or uplink communication. In (c) of FIG. 10, the NR-PDSCH can be scheduled by the NR-PDCCH in the same slot. In (d) and (e) of FIG. 10, the NR-PDSCH and the NR-PUSCH can be scheduled by the NR-PDCCHs mapped to different slots, RRC signaling, or the like. In (h) of FIG. 10, the entire slot is used as a region in which communication is not performed as the guard period.

Overview of Uplink Signal Waveform in the Present Embodiment

In the present embodiment, a plurality of types of signal waveforms are specified in uplink. For example, two uplink signal waveforms are specified as a first signal waveform and a second signal waveform. In the present embodiment, a first signal waveform is assumed to be CP-OFDM, and a second signal waveform is assumed to be SC-FDMA. Further, the second signal waveform is also referred to as discrete Fourier transform-spread-orthogonal frequency division multiplexing (DFT-s-OFDM).

In other words, the first signal waveform is a multicarrier signal, and the second signal waveform is a single carrier signal. Further, the first signal waveform is identical to the downlink signal waveform in LTE and NR, and the second signal waveform is identical to the uplink signal waveform in LTE.

These signal waveforms can differ in power efficiency, transmission efficiency, transmission (generation) method, reception method, resource mapping, or the like. For example, since the second signal waveform can reduce a peak-to-average power ratio (PAPR), the second signal waveform is more excellent in power efficiency than the first signal waveform. Further, since the first signal waveform can perform data and frequency multiplexing on the reference signal in a frequency direction, the first signal waveform is more excellent in transmission efficiency than the second signal waveform. Further, in a case in which it is necessary to perform frequency domain equivalence in the reception process for the second signal waveform, the second signal waveform is higher in the load of the reception process than the first signal waveform. Further, since the first signal waveform is narrower in the subcarrier interval than the second signal waveform, the first signal waveform is likely to be affected by phase noise particularly in a high frequency band.

Figure 11:
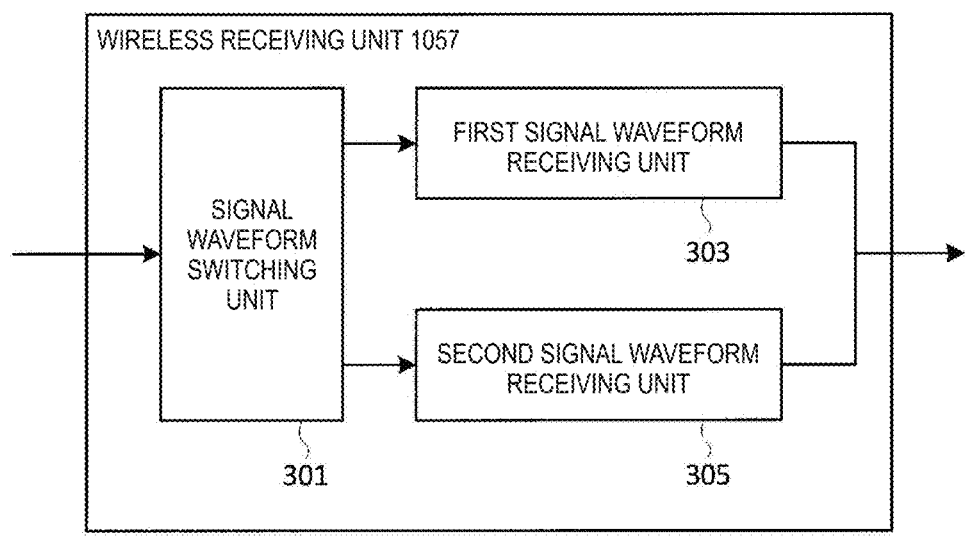
FIG. 11 is a block diagram illustrating a configuration of a wireless receiving unit of the present embodiment.

Details of Wireless Transmitting Unit and Wireless Receiving Unit of Uplink Signal Waveform in the Present Embodiment The wireless receiving unit 1057 in the base station device 1 supporting both the first signal waveform and the second signal waveform will now be described in detail. FIG. 11 is a block diagram illustrating a configuration of the wireless receiving unit 1057. The wireless receiving unit 1057 includes a signal waveform switching unit 301, a first signal waveform receiving unit 303, and a second signal waveform receiving unit 305. The signal waveform switching unit 301 switches whether the received uplink communication is a first signal waveform or a second signal waveform according to a predetermined condition or situation. In a case in which received uplink communication is the first signal waveform, the uplink communication undergoes the reception process by the first signal waveform receiving unit 303. In a case in which received uplink communication is the second signal waveform, the uplink communication undergoes the reception process by the second signal waveform receiving unit 305. A condition or a situation of switching in the signal waveform switching unit 301 will be described later. Further, the signal waveform switching unit is also referred to as a signal waveform control unit. Further, although the first signal waveform receiving unit 303 and the second signal waveform receiving unit 305 are described as different processing units in FIG. 11, only a part of the reception process can be switched and performed by one processing unit.

Figure 12:
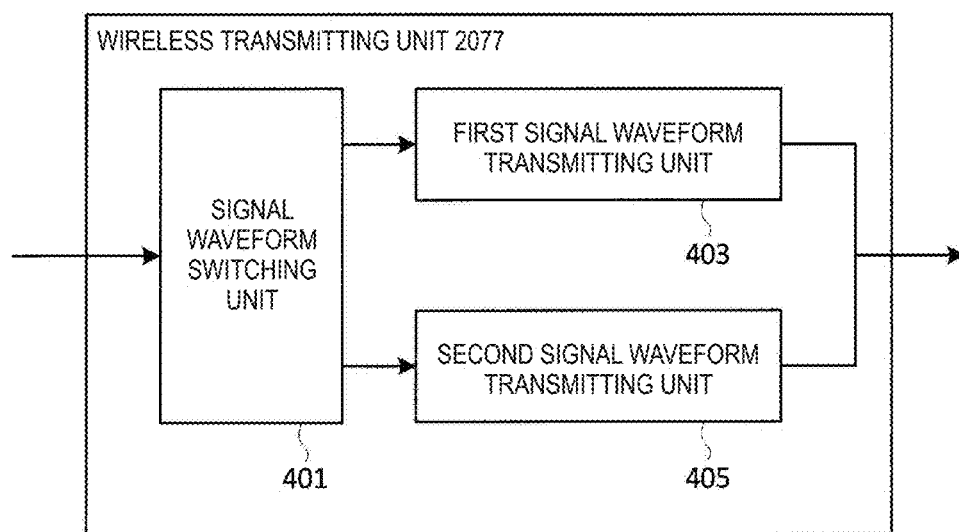
FIG. 12 is a block diagram showing a configuration of a wireless transmitting unit of the present embodiment.

The wireless transmitting unit 2077 in the terminal device 2 supporting both the first signal waveform and the second signal waveform will now be described in detail. FIG. 12 is a block diagram illustrating a configuration of the wireless transmitting unit 2077. The wireless transmitting unit 2077 includes a signal waveform switching unit 401, a first signal waveform transmitting unit 403, and a second signal waveform transmitting unit 405. The signal waveform switching unit 401 switches whether uplink communication to be transmitted is the first signal waveform or the second signal waveform in accordance with a predetermined condition or situation. In a case in which the uplink communication to be transmitted is the first signal waveform, the uplink communication undergoes the transmission process by the first signal waveform transmitting unit 403. In a case in which the uplink communication to be transmitted is the second signal waveform, the uplink communication is transmitted by the second signal waveform transmitting unit 405. The condition or the situation of switching in the signal waveform switching unit 401 will be described later. Further, the signal waveform switching unit is also referred to as a signal waveform control unit. Further, although the first signal waveform receiving unit 403 and the second signal waveform receiving unit 405 are described as different processing units in FIG. 12, only a part of the transmission process can be switched and performed by one processing unit.

Figure 13:
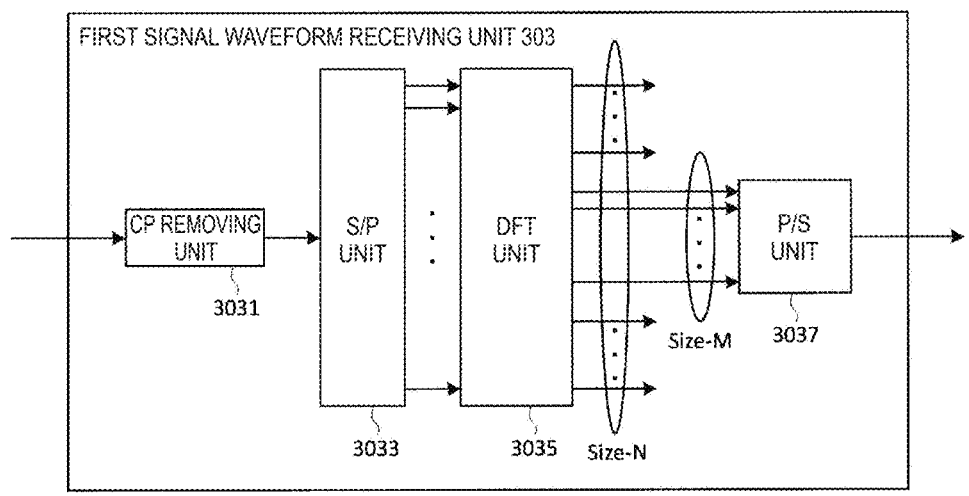
FIG. 13 is a block diagram illustrating a configuration of a first signal waveform receiving unit of the present embodiment.

FIG. 13 is a block diagram illustrating a configuration of the first signal waveform receiving unit 303. The first signal waveform receiving unit 303 performs the reception process on the uplink channel and the signal transmitted by the CP-OFDM as the signal waveform of the uplink communication. The first signal waveform receiving unit 303 includes a CP removing unit 3031, an S/P unit 3033, a discrete Fourier transform (DFT) unit 3035, and a P/S unit 3037. The CP removing unit 3031 removes a cyclic prefix (CP) added to the received uplink communication. The S/P unit 3033 converts an input serial signal into a parallel signal of a size N. The DFT unit 3035 performs a Fourier transform process. Here, in a case in which the size N is a power of 2, a fast Fourier transform (FFT) process can be performed as the Fourier transform process. The P/S unit 3037 converts the input parallel signal of the size M into a serial signal. Here, the signal of the uplink communication transmitted by the terminal device 2 performing the reception process is input to the P/S unit 3037. Further, the size M is decided depending on the size of the frequency domain resources used as the uplink communication.

Figure 14:
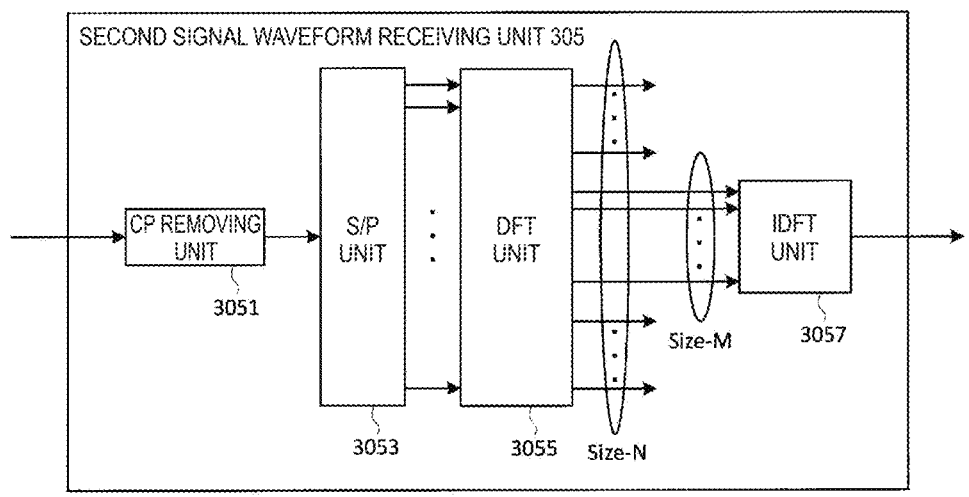
FIG. 14 is a block diagram illustrating a configuration of a second signal waveform receiving unit of the present embodiment.

FIG. 14 is a block diagram illustrating a configuration of the second signal waveform receiving unit 305. The second signal waveform receiving unit 305 performs the reception process on the uplink channel and the signal transmitted by the SC-FDMA as the signal waveform of the uplink communication. The second signal waveform receiving unit 305 includes a CP removing unit 3051, an S/P unit 3053, a DFT unit 3055, and an inverse discrete Fourier transform (IDFT) unit 3057. The CP removing unit 3051 removes the CP added to the received uplink communication. The S/P unit 3053 converts an input serial signal into a parallel signal of a size N. The DFT unit 3055 performs the Fourier transform process. Here, in a case in which the size N is a power of 2, the FFT process can be performed as the Fourier transform process. The IDFT unit 3057 performs an inverse Fourier transform process on the input signal of the size M. Here, the signal of the uplink communication transmitted by the terminal device 2 performing the reception process is input to the IDFT unit 3057. Further, the size M is decided depending on the size of the frequency domain resources used as the uplink communication.

Figure 15:
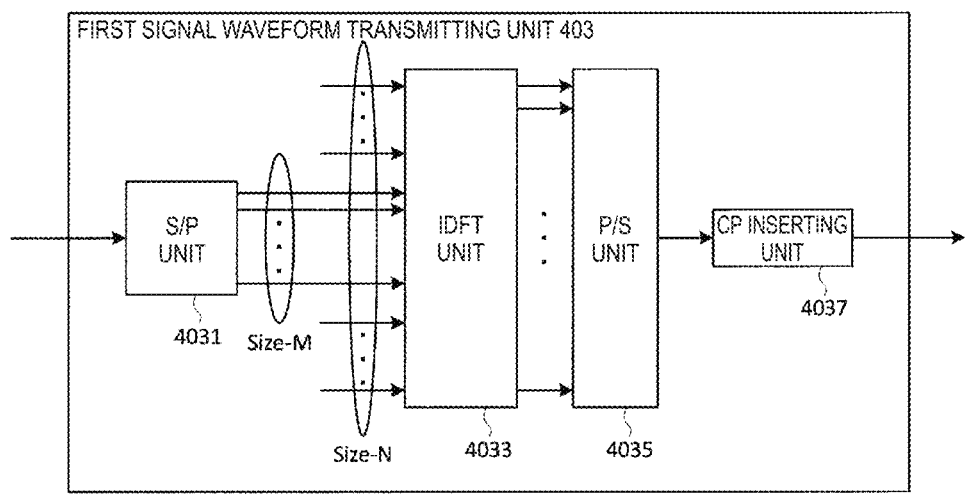
FIG. 15 is a block diagram illustrating a configuration of a first signal transmitting unit of the present embodiment.

FIG. 15 is a block diagram illustrating a configuration of the first signal waveform transmitting unit 403. The first signal waveform transmitting unit 403 performs the transmission process on the uplink channel and the signal transmitted by the CP-OFDM as the signal waveform of the uplink communication. The first signal waveform transmitting unit 403 includes an S/P unit 4031, an IDFT unit 4033, a P/S unit 4035, and a CP inserting unit 4037. The S/P unit 4031 converts an input serial signal into a parallel signal of a size M. Here, the size M is decided depending on the size of the frequency domain resources used as uplink communication. The parallel signal of the size M is input to the IDFT unit 4033 to correspond to a predetermined frequency domain. The IDFT unit 4033 performs the inverse Fourier transform process on the parallel signal of the size N. Here, in a case in which the size N is a power of 2, the IFFT process can be performed as the Fourier transform process. The P/S unit 4035 converts the parallel signal of the size N to a serial signal. The CP inserting unit 4037 inserts a predetermined CP for each OFDM symbol.

Figure 16:
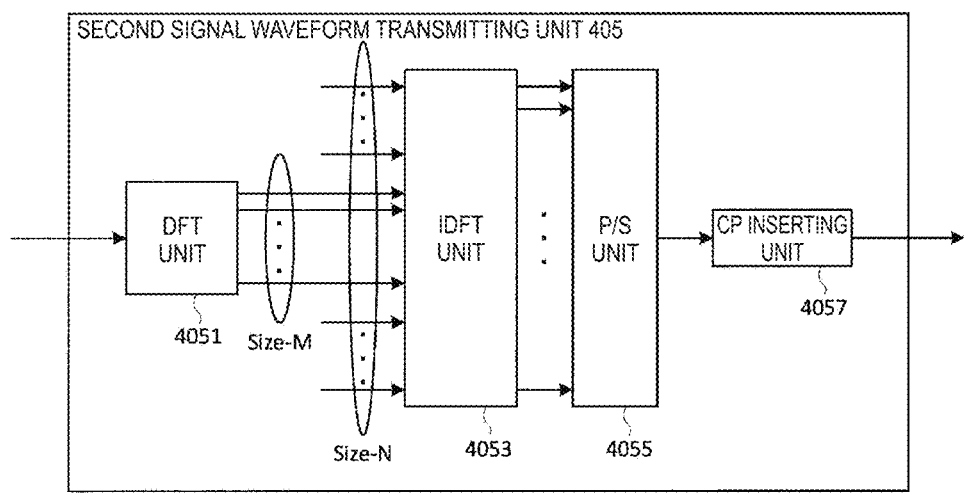
FIG. 16 is a block diagram illustrating a configuration of a second signal transmitting unit of the present embodiment.

FIG. 16 is a block diagram illustrating the configuration of the second signal waveform transmitting unit 405. The second signal waveform transmitting unit 403 performs the transmission process on the uplink channel and the signal transmitted by the SC-FDMA as the signal waveform of the uplink communication. The second signal waveform transmitting unit 405 includes a DFT unit 4051, an IDFT unit 4053, a P/S unit 4055, and a CP inserting unit 4057. The S/P unit 4051 performs the DFT conversion on a parallel signal of a size M. Here, the size M is decided depending on the size of the frequency domain resources used as uplink communication. The parallel signal of the size M is input to the IDFT unit 4053 to correspond to a predetermined frequency domain. The IDFT unit 4053 performs the inverse Fourier transform process on the parallel signal of the size N. Here, in a case in which the size N is a power of 2, the IFFT process can be performed as the Fourier transform process. The P/S unit 4055 converts the parallel signal of the size N to a serial signal. The CP inserting unit 4057 inserts a predetermined CP for each SC-FDMA symbol.

Signaling Related to Control Method of Uplink Signal Waveform in the Present Embodiment As described above, the first signal waveform and the second signal waveform have different characteristics or features in various points. Therefore, it is preferable for the base station device 1 and the terminal device 2 supporting both the first signal waveform and the second signal waveform to switch and use an optimal signal waveform in accordance with a situation or a condition. Signaling related to the control method of the uplink signal waveform in the present embodiment will be described below.

Figure 17:
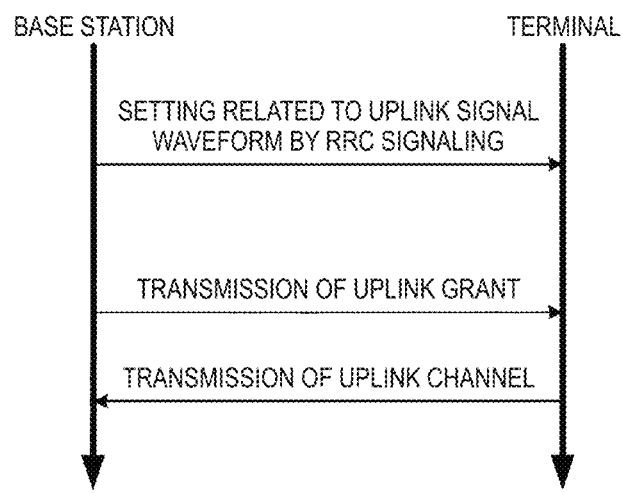
FIG. 17 is a diagram illustrating an example of signaling related to a quasi-static control method of an uplink signal waveform of the present embodiment.

An example of the signaling related to the control method of the uplink signal waveform in the present embodiment is performed in a quasi-static manner by RRC signaling. FIG. 17 illustrates an example of signaling related to the quasi-static control method of the uplink signal waveform. The base station device 1 performs settings related to the uplink signal waveform to the terminal device 2 through RRC signaling. The RRC signaling may be a setting specific to the terminal device 2 or a setting specific to the base station device 1. Then, the base station device 1 notifies the terminal device 2 of downlink control information for performing a grant (allocation) related to transmission of the uplink channel. The downlink control information can be transmitted through the NR-PDCCH. The terminal device 2 transmits the NR-PUSCH as the uplink channel on the basis of the uplink grant. The NR-PUSCH is transmitted by an already set uplink signal waveform.

Figure 18:
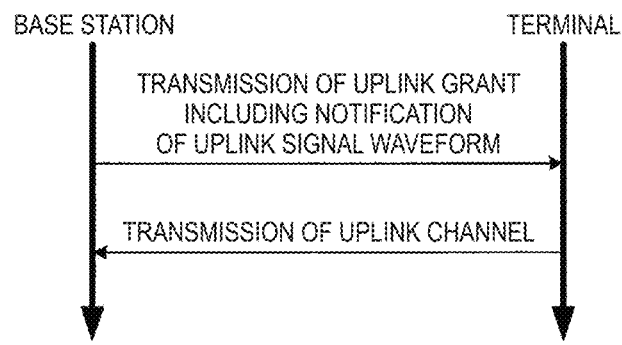
FIG. 18 is a diagram illustrating an example of signaling related to a dynamic control method of an uplink signal waveform of the present embodiment.

Another example of the signaling related to the control method of the uplink signal waveform in the present embodiment is dynamically performed by NR-PDCCH signaling. FIG. 18 illustrates an example of the signaling related to the dynamic control method of the uplink signal waveform. The base station device 1 notifies the terminal device 2 of downlink control information for performing a grant (allocation) related to transmission of the uplink channel. The downlink control information includes information related to the uplink signal waveform. The information related to the uplink signal waveform may be included in the downlink control information different from the uplink grant and notified in a manner specific to the terminal device 2 or the base station device 1. The downlink control information can be transmitted through the NR-PDCCH. The terminal device 2 transmits the NR-PUSCH as the uplink channel on the basis of the uplink grant. The NR-PUSCH is transmitted by the uplink signal waveform decided on the basis of information which is notified simultaneously or separately.

Details of Control Method of Uplink Signal Waveform in the Present Embodiment

As already described above, it is desirable for the base station device 1 and the terminal device 2 supporting both the first signal waveform and the second signal waveform to switch and use the optimal signal waveform in accordance with various situations or conditions. The situation or the condition in the control method of the uplink signal waveform will be described below. Further, the situation or the condition described below may be applied alone, or a plurality of situations or conditions may be applied in combination.

Further, the uplink communication can be transmitted using a predetermined signal waveform until the signal waveform for the uplink communication is set by RRC signaling or the like. In other words, a default signal waveform can be specified in advance. Further, a default signal waveform can be set by broadcasting information from base station device 2. For example, a default signal waveform is the second signal waveform.

(1) Specific Examples of Control Performed in Manner Specific to Terminal Device or Base Station Device in Quasi-Static Control Method of Uplink Signal Waveform Specific examples in a case in which control is performed in a manner specific to the terminal device or the base station device in the quasi-static control method of the uplink signal waveform will be described.

(1-1) Control Based on Frame Configuration

As one of the specific examples, the control of the uplink signal waveform is performed on the basis of the frame configuration. For the uplink signal waveform, the uplink signal waveform to be used or the uplink signal waveform which can be set is implicitly decided depending on the frame configuration used for the uplink communication.

For example, the uplink signal waveform is decided depending on whether the frame configuration used for the uplink communication is a self-contained frame or a non-self-contained frame. A self-contained frame is a frame including downlink communication and uplink communication associated therewith in one frame (slot) as illustrated in (a) and (b) of FIG. 10.

In a self-contained frame, since the number of symbols of the NR-PUCCH is small, it is desirable that the first signal waveform be used as illustrated in (a) of FIG. 10. Therefore, in a self-contained frame, only the first signal waveform may be able to be set. In other words, in a case in which a self-contained frame is set to be used for predetermined uplink communication through RRC signaling, the terminal device 2 transmits the uplink communication through the first signal waveform.

On the other hand, in the case of a non-self-contained frame, the first signal waveform or the second signal waveform may be further set for the uplink communication. Further, in the case of a non-self-contained frame, the uplink communication may be specified to use the second signal waveform.

(1-2) Control Based on Subcarrier Interval

As one of the specific examples, the control of the uplink signal waveform is performed on the basis of the subcarrier interval. For the uplink signal waveform, the uplink signal waveform to be used or the uplink signal waveform which can be set is implicitly decided depending on the subcarrier interval used for the uplink communication.

For example, in a case in which the subcarrier interval used for the uplink communication is equal to or less than a predetermined value which is set or specified, the uplink communication uses the second signal waveform. The predetermined value may be 15 kHz. Further, in the case of a subcarrier interval exceeding the predetermined value, the first signal waveform or the second signal waveform may be further set for the uplink communication, or it may be specified to use the first signal waveform.

For example, in a case in which the subcarrier interval used for the uplink communication is a reference value (default value) which is set or specified, the uplink communication uses the second signal waveform. The reference value may be 15 kHz. Further, in the case of a subcarrier interval other than the reference value, the first signal waveform or the second signal waveform may be further set for the uplink communication, or it may be specified to use the first signal waveform.

(1-3) Control Based on Transmission Mode Related to Spatial Multiplexing in Uplink As one of the specific examples, the control of the uplink signal waveform is performed on the basis of the transmission mode related to the spatial multiplexing in the uplink. For the uplink signal waveform, the uplink signal waveform to be used or the uplink signal waveform which can be set is implicitly decided depending on the transmission mode related to the spatial multiplexing set for the uplink communication.

For example, in a case in which the transmission mode related to the spatial multiplexing set for the uplink communication is a mode in which multi-stream (multi-layer, spatial multiplexing) communication can be performed, the first signal waveform is used for the uplink communication. Further, in a case in which the transmission mode related to the spatial multiplexing set for the uplink communication is a mode in which only single stream (single layer, non-spatial multiplexing) communication is supported, the first signal waveform or the second signal waveform may be further set for the uplink communication, or it may be specified to use the second signal waveform.

(1-4) Control Based on Transmission Time Interval Length (TTI Length)

As one of the specific examples, the control of the uplink signal waveform is performed on the basis of a TTI length. For the uplink signal waveform, the uplink signal waveform to be used or the uplink signal waveform which can be set is implicitly decided depending on the TTI length used for the uplink communication. Here, the TTI length may be defined by a physical time length or may be defined by the number of OFDM symbols or the number of SC-FDMA symbols.

For example, in a case in which the TTI length used for the uplink communication is equal to or less than a predetermined value, the first signal waveform is used for the uplink communication. The predetermined value is a value smaller than a length of a slot which is set or specified and is a value smaller than 7 or 14 symbols or a value smaller than 0.5 ms or 1 ms. In other words, in a case in which it is required to perform the uplink communication with low latency, the uplink communication may use the first signal waveform. Further, in a case in which the TTI length used for the uplink communication exceeds the predetermined value, the first signal waveform or the second signal waveform may be further set for the uplink communication, or it may be specified to use the second signal waveform.

(1-5) Control Based on Transmission Mode Related to Schedule in Uplink

As one of the specific examples, the control of the uplink signal waveform is performed on the basis of the transmission mode related to a schedule in the uplink. For the uplink signal waveform, the uplink signal waveform to be used or the uplink signal waveform which can be set is implicitly decided depending on the transmission mode related to a schedule set for the uplink communication.

Here, the transmission mode related to the schedule in the uplink is a grant-based transmission mode and a non-grant-based transmission mode. In the grant-based transmission mode, each uplink communication is scheduled and performed on the basis of the uplink grant notified by the base station device 1 through the NR-PDCCH. Therefore, in the grant-based transmission mode, since collision does not occur with other uplink communication, highly reliable communication can be realized. In the non-grant-based transmission mode, the base station device 1 does not notify of the uplink grant for each uplink communication, and the terminal device 2 performs the uplink communication using uplink resources set by the RRC signaling. Therefore, even in a case in which uplink data occurs, the terminal device 2 can perform the uplink communication without waiting for the uplink grant from the base station device 2. Further, in order to reduce collisions with other uplink communications, a non-orthogonal access scheme may be supported for the uplink communication.

For example, in a case in which the transmission mode related to the schedule set for the uplink communication is the non-grant-based transmission mode, the first signal waveform is used for the uplink communication. This is a suitable method in a case in which the non-grant-based transmission mode is used for the URLLC. Further, in a case in which the transmission mode related to the schedule set for the uplink communication is the grant-based transmission mode, the first signal waveform or the second signal waveform may be further set for the uplink communication, or it may be specified to use the second signal waveform.

For example, in a case in which the transmission mode related to the schedule set for the uplink communication is the non-grant-based transmission mode, the second signal waveform is used for the uplink communication. This is a suitable method in a case in which the non-grant-based transmission mode is used for the mMTC. Further, in a case in which the transmission mode related to the schedule set for the uplink communication is the grant-based transmission mode, the first signal waveform or the second signal waveform may be further set for the uplink communication, or it may be specified to use the first signal waveform.

(1-6) Control Based on Type of Uplink Communication

As one of the specific examples, the control of the uplink signal waveform is performed on the basis of a type of uplink communication. For the uplink signal waveform, the uplink signal waveform to be used or the uplink signal waveform which can be set is implicitly decided depending on the type of uplink communication.

Here, the type of uplink communication includes uplink channels such as the NR-PRACH, the NR-PUCCH, and the NR-PUSCH and uplink signals such as the SRS and the DMRS.

For example, in a case in which the type of uplink communication is the NR-PUCCH, the second signal waveform is used for the uplink communication. This is a method suitable for transmission of control information requiring high reliability. Further, in this case, it is desirable that the NR-PUCCH be transmitted through the non-self-contained frame. Further, in a case in which the type of uplink communication is the NR-PUSCH, the first signal waveform or the second signal waveform may be further set for the uplink communication, or it may be specified to use the first signal waveform.

(1-7) Control Based on Modulation Scheme of Uplink Communication

As one of the specific examples, the control of the uplink signal waveform is performed on the basis of a modulation scheme of the uplink communication. For the uplink signal waveform, the uplink signal waveform to be used or the uplink signal waveform which can be set is implicitly decided depending on the modulation scheme of the uplink communication.

Here, the modulation scheme of the uplink communication includes a binary phase shift keying (BPSK), a quadrature PSK (QPSK), and a quadrature amplitude modulation (QAM). Further, the modulation scheme of the uplink communication includes a uniform constellation in which intervals of signal points are constant and a non-uniform constellation in which intervals of signal points are not constant.

For example, in a case in which the uplink communication is a predetermined modulation scheme, the first signal waveform is used for the uplink communication. The predetermined modulation scheme is a modulation scheme with a high modulation level and is, for example, 256 QAM. Further, the predetermined modulation scheme is the non-uniform constellation. This is a method suitable for transmission requiring high transmission efficiency. In other words, the predetermined modulation scheme uses only the first signal waveform. Further, in a case in which the uplink communication is not the predetermined modulation scheme, the first signal waveform or the second signal waveform may be further set for the uplink communication, or it may be specified to use the second signal waveform.

(1-8) Control Based on Frequency Band of Uplink Communication

As one of the specific examples, the control of the uplink signal waveform is performed on the basis of a frequency band of the uplink communication. For the uplink signal waveform, the uplink signal waveform to be used or the uplink signal waveform which can be set is implicitly decided depending on the frequency band of the uplink communication.

For example, in a case in which the frequency band of the uplink communication is equal to or larger than a predetermined value, the second signal waveform is used for the uplink communication. The predetermined value is a high frequency band, for example, 40 GHz. In other words, only the second signal waveform is used in a frequency band of the predetermined value or more. Further, in a case in which the frequency band of the uplink communication is less than the predetermined value, the first signal waveform or the second signal waveform may be further set for the uplink communication, or it may be specified to use the first signal waveform.

(1-9) Control Based on CP Length in Uplink Communication

As one of the specific examples, the control of the uplink signal waveform is performed on the basis of a CP length in the uplink communication. For the uplink signal waveform, the uplink signal waveform to be used or the uplink signal waveform which can be set is implicitly decided depending on the CP length in the uplink communication.

Here, in NR, a plurality of CP length types can be supported in a predetermined subcarrier interval. For example, NR supports a first CP length and a second CP length. The first CP length and the second CP length are also referred to as a normal CP and an extended CP, respectively. In the first CP length, the CP length is specified such that one slot is constituted by seven symbols. In the second CP length, the CP length is specified such that one slot is constituted by six symbols.

For example, in a case in which the uplink communication is the second CP length, the second signal waveform is used for the uplink communication. In other words, in the uplink communication in which the second CP length is used, only the second signal waveform is used. Further, in a case in which the uplink communication is the first CP length, the first signal waveform or the second signal waveform may be further set for the uplink communication, or it may be specified to use the first signal waveform.

(1-10) Control Based on Predetermined Parameter in Uplink Communication

As one of the specific examples, the control of the uplink signal waveform is performed on the basis of a predetermined parameter in the uplink communication. For the uplink signal waveform, the uplink signal waveform to be used or the uplink signal waveform which can be set is implicitly decided depending on a value of the predetermined parameter in the uplink communication.

Here, the predetermined parameter includes a timing offset (Timing Advance Offset) of uplink transmission, a transmission mode related to repetitive transmission of uplink transmission, a RNTI to be set, and a transmission mode related to a transmission path of uplink transmission.

For example, in a case in which the predetermined parameter is a first value or state in the uplink communication, a predetermined signal waveform is used for the uplink communication. In other words, in the case of the second signal waveform, only the first value or state is used as the predetermined parameter. Further, in a case in which the predetermined parameter is a second value or state in the uplink communication, the first signal waveform or the second signal waveform may be further set for the uplink communication, or it may be specified to use a signal waveform different from a predetermined signal waveform.

For example, in the uplink communication, a range of a settable value of the timing offset of the uplink transmission is specified to be different between the first signal waveform and the second signal waveform.

For example, in a case in which the predetermined parameter is the transmission mode related to the transmission path of the uplink transmission, it is specified that the first signal waveform or the second signal waveform is decided depending on whether or not the transmission path is a relay communication.

(2) Specific Examples of Control Performed in Manner Specific to Terminal Device or Base Station Device in Dynamic Control Method of Uplink Signal Waveform Specific examples in a case in which control is performed in a manner specific to the terminal device or the base station device in the dynamic control method of the uplink signal waveform will be described.

(2-1) Explicit Control Based on Uplink Grant for Uplink Communication

As one of the specific examples, the control of the uplink signal waveform is explicitly performed on the basis of the uplink grant for the uplink communication. For the uplink signal waveform, the uplink signal waveform to be used or the uplink signal waveform which can be set is explicitly decided depending on the DCI in the uplink grant.

For example, a predetermined bit field includes signal waveform notification information indicating whether the uplink signal waveform for the uplink communication is the first signal waveform or the second signal waveform. The signal waveform notification information may be a single piece of information or may be joint-coded with other information.

Further, in a case in which the predetermined bit field is not included in the uplink grant, the uplink communication may be set or specified to use a predetermined signal waveform.

(2-2) Implicit Control Based on Uplink Grant for Uplink Communication

As one of the specific examples, the control of the uplink signal waveform is implicitly performed on the basis of the uplink grant for the uplink communication. For the uplink signal waveform, the uplink signal waveform to be used or the uplink signal waveform which can be set is explicitly decided depending on predetermined information in the DCI in the uplink grant.

For example, in a case in which the predetermined information is a predetermined value, a predetermined signal waveform is used for the uplink communication. Further, in a case in which the predetermined information is not the predetermined value, a signal waveform different from the predetermined signal waveform is used for the uplink communication.

For example, in a case in which a parameter such as modulation and coding scheme (MCS) or the like is schedule independently for two transport blocks in the DCI in the uplink grant, a predetermined parameter for a second transport block is implicitly notified with respect to the uplink signal waveform. Specifically, in a case in which the predetermined parameter for the second transport block is a predetermined value, the uplink communication uses the second signal waveform. In a case in which the predetermined parameter for the second transport block is not a predetermined value, the uplink communication uses the first signal waveform. Further, in a case in which the predetermined parameter is not used for the schedule of the second transport block, the uplink communication uses the second signal waveform. In a case in which that predetermined parameter is used for the schedule of the second transport block, the uplink communication uses the first signal waveform. This is because single stream communication can be performed in a case in which the second transport block is not scheduled, in this case, it is desirable to use the second signal waveform.

(2-3) Control Based on DCI Format of Uplink Grant for the Uplink Communication

As one of the specific examples, the control of the uplink signal waveform is implicitly performed on the basis of a DCI format of the uplink grant for the uplink communication. For the uplink signal waveform, the uplink signal waveform to be used or the uplink signal waveform which can be set is implicitly decided depending on the DCI format of the uplink grant for the uplink communication.

For example, in a case in which certain uplink communication is scheduled in a first DCI format, the uplink communication is transmitted using the first signal waveform, and in a case in which certain uplink communication is scheduled in a second DCI format, the uplink communication is transmitted using the second signal waveform. For example, the first DCI format is a DCI format corresponding to the communication mode in which multi-stream communication can be performed, and the second DCI format is a DCI format corresponding to the communication mode in which only single stream communication can be performed. Further, the second DCI format is a DCI format used regardless of the communication mode to be set and can be used for the purpose of fallback.

(2-4) Control Based on Search Space of Uplink Grant for Uplink Communication

As one of the specific examples, the control of the uplink signal waveform is implicitly performed on the basis of the search space of the uplink grant for the uplink communication. For the uplink signal waveform, the uplink signal waveform to be used or the uplink signal waveform which can be set is implicitly decided depending on the search space in which the uplink grant for the uplink communication is detected.

For example, in a case in which certain uplink grant for an uplink communication is detected in a first search space, the uplink communication is transmitted using the first signal waveform, and in a case in which certain uplink communication is detected in a second search space, the uplink communication is transmitted using the second signal waveform. For example, the first search space is a USS, and the second search space is a CSS. Further, the second search space is a search space that does not depend on a parameter specific to the terminal device and can be used for the purpose of fallback.

(2-5) Control Based on Type of Frame Scheduled for Uplink Communication

As one of the specific examples, the control of the uplink signal waveform is implicitly performed on the basis of a type of frame scheduled for the uplink communication. In other words, the control of the uplink signal waveform is implicitly performed on the basis of the type of frame used for the uplink communication scheduled by the uplink grant. For the uplink signal waveform, the uplink signal waveform to be used or the uplink signal waveform which can be set is implicitly decided depending on the type of frame scheduled for the uplink communication.

For example, in a case in which the type of frame used for certain uplink communication is a first frame, the uplink communication is transmitted using the first signal waveform, and in a case in which the type of frame used for certain uplink communication is a second frame, the uplink communication is transmitted using the second signal waveform. For example, the first frame is an uplink sub frame, and the second frame is a special sub frame. This method is suitable for the non-self-contained frame.

(2-6) Control Based on RNTI of Uplink Grant for Uplink Communication

As one of the specific examples, the control of the uplink signal waveform is implicitly performed on the basis of an RNTI of the uplink grant for the uplink communication. For the uplink signal waveform, the uplink signal waveform to be used or the uplink signal waveform which can be set is implicitly decided depending on the RNTI used in the uplink grant for the uplink communication.

For example, in a case in which the RNTI used in the uplink grant for certain uplink communication is a first RNTI, the uplink communication is transmitted using the first signal waveform, and in a case in which the RNTI used in the uplink grant for a certain uplink communication is a second RNTI, the uplink communication is sent using the second signal waveform. For example, the first RNTI is an RNTI specific to the terminal device, and the second RNTI is an RNTI independent of the terminal device. Further, the second RNTI is an RNTI specific to the base station device or a RNTI specified in advance and can be used for the purpose of fallback or broadcasting to a plurality of terminal devices.

Criterion for Control of Uplink Signal Waveform in the Present Embodiment

In the control of the uplink signal waveform, the base station device 1 can be controlled on the basis of various criteria.

In one example of the criterion, the control is decided on the basis of a distance of the terminal device 2 from the base station device 1. As a method of recognizing the distance, the base station device 1 can decide it using a path loss, a transmission power, a power headroom indicating the remaining power to the maximum power which the terminal device 2 can transmit, or the like.

In one example of the criterion, the control is decided on the basis of a service of the base station device 1 and/or the terminal device 2 or a setting of a network. For example, it is decided in accordance with an eMBB, a URLLC, or an mMTC as a service requested or set in the terminal device 2. Further, it is decided in accordance with information related to a network slice requested or set in the terminal device 2.

In one example of the criterion, the control is decided on the basis of terminal position information and/or zone information. For example, the terminal position information is information used for sidelink communication or road-to-vehicle communication. Further, the zone information may be defined by the number of transmission and reception points (TRPs) existing in the periphery thereof.

In one example of the criterion, the control is decided on the basis of channel congestion information. For example, the channel congestion information is information related to a congestion degree within a predetermined resource measured by terminal device 2, and the information can be reported to the base station device 1. Further, the channel congestion information may be measured by the base station device 1.

Further, the uplink signal waveform may be controlled by terminal device 2. For example, the terminal device 2 can decide the signal waveform depending on whether or not the maximum transmission power is exceeded or not. In this case, the base station device 1 can receive all the signal waveforms used by the terminal device 2 by performing the reception process.

Application of Uplink Signal Waveform to Sidelink in the Present Embodiment

The content described in the present embodiment can also be applied to sidelink communication. In a case in which NR supports a plurality of signal waveforms for sidelink communication, it can be controlled by the method described in the present embodiment. In other words, a sidelink signal waveform can be decided depending on a predetermined condition or situation. For example, as described above, the sidelink signal waveform supports the first signal waveform and the second signal waveform. In other words, in the description of the present embodiment, the uplink can be read as the sidelink. For example, the uplink communication and the uplink signal waveform can be read as sidelink communication and the sidelink signal waveform, respectively.

In addition, the sidelink signal waveform can be set independently for each predetermined resource pool.

Further, the sidelink signal waveform is decided on the basis of whether a resource (including a sub frame, a frame, a slot, a carrier, a resource block, or the like) used for the sidelink communication is a first resource or a second resource. For example, in a case in which the resource is a downlink resource as the first resource, the sidelink communication is transmitted using the first signal waveform, and in a case in which the resource is an uplink resource as the second resource, the sidelink communication is transmitted using the second signal waveform.

Terminal Capability Information Related to Uplink Signal Waveform in the Present Embodiment In the present embodiment, the terminal device 2 can notify the base station device 1 of terminal capability information indicating functions or capabilities of the terminal device 2. The base station device 1 can recognize the functions or the capabilities of the terminal device 2 on the basis of the terminal capability information, and uses it for settings and a schedule to the terminal device 2. For example, the terminal capability information includes information indicating functions or capabilities related to the uplink signal waveform.

In the present embodiment, predetermined terminal capability information can be independently set for each uplink signal waveform.

For example, the predetermined terminal capability information is information related to support of simultaneous transmission of predetermined uplink communication. Specifically, the predetermined terminal capability information is information related to support of simultaneous transmission of the NR-PUCCH and the NR-PUSCH. Further, the terminal capability information can individually define information related to support of simultaneous transmission of the NR-PUCCH using the first signal waveform and the NR-PUSCH using the first signal waveform, information related to support of simultaneous transmission of the NR-PUCCH using the first signal waveform and the NR-PUSCH using the second signal waveform, information related to support of simultaneous transmission of the NR-PUCCH using the second signal waveform and the NR-PUSCH using the first signal waveform, and information related to support of simultaneous transmission of the NR-PUCCH using the second signal waveform and the NR-PUSCH using the second signal waveform.

Further, similarly, the terminal device 2 supporting the sidelink communication can individually notify of information related to support of simultaneous transmission of the uplink communication and the sidelink communication for each signal waveform.

Further, for example, predetermined terminal capability information is information related to support of discontinuous resource allocation. Specifically, a notification of information of whether or not the uplink communication (including the sidelink communication as well) supports the discontinuous resource allocation can be given individually for each signal waveform. Further, in a case in which the discontinuous allocation is supported, the terminal capability information can notify of the maximum number of clusters (resource division number).

Application Examples

The technology according to the present disclosure can be applied to various products. For example, the base station device 1 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the base station device 1 may be realized as another type of base station such as a Node B or a base transceiver station (BTS). The base station device 1 may include a main entity (also referred to as a base station device) that controls wireless communication and one or more remote radio heads (RRHs) disposed at different locations from the main entity. Further, various types of terminals to be described below may operate as the base station device 1 by performing a base station function temporarily or permanently.

Further, for example, the terminal device 2 may be realized as a mobile terminal such as a smartphone, a tablet personal computer (PC), a notebook PC, a portable game terminal, a portable/dongle mobile router or a digital camera, or an in-vehicle terminal such as a car navigation device. Further, the terminal device 2 may be realized as a terminal that performs machine to machine (M2M) communication (also referred to as a machine type communication (MTC) terminal). Moreover, the terminal device 2 may be a wireless communication module mounted on the terminal (for example, an integrated circuit module configured on one die).

Application Examples for Base Station

First Application Example

Figure 19:
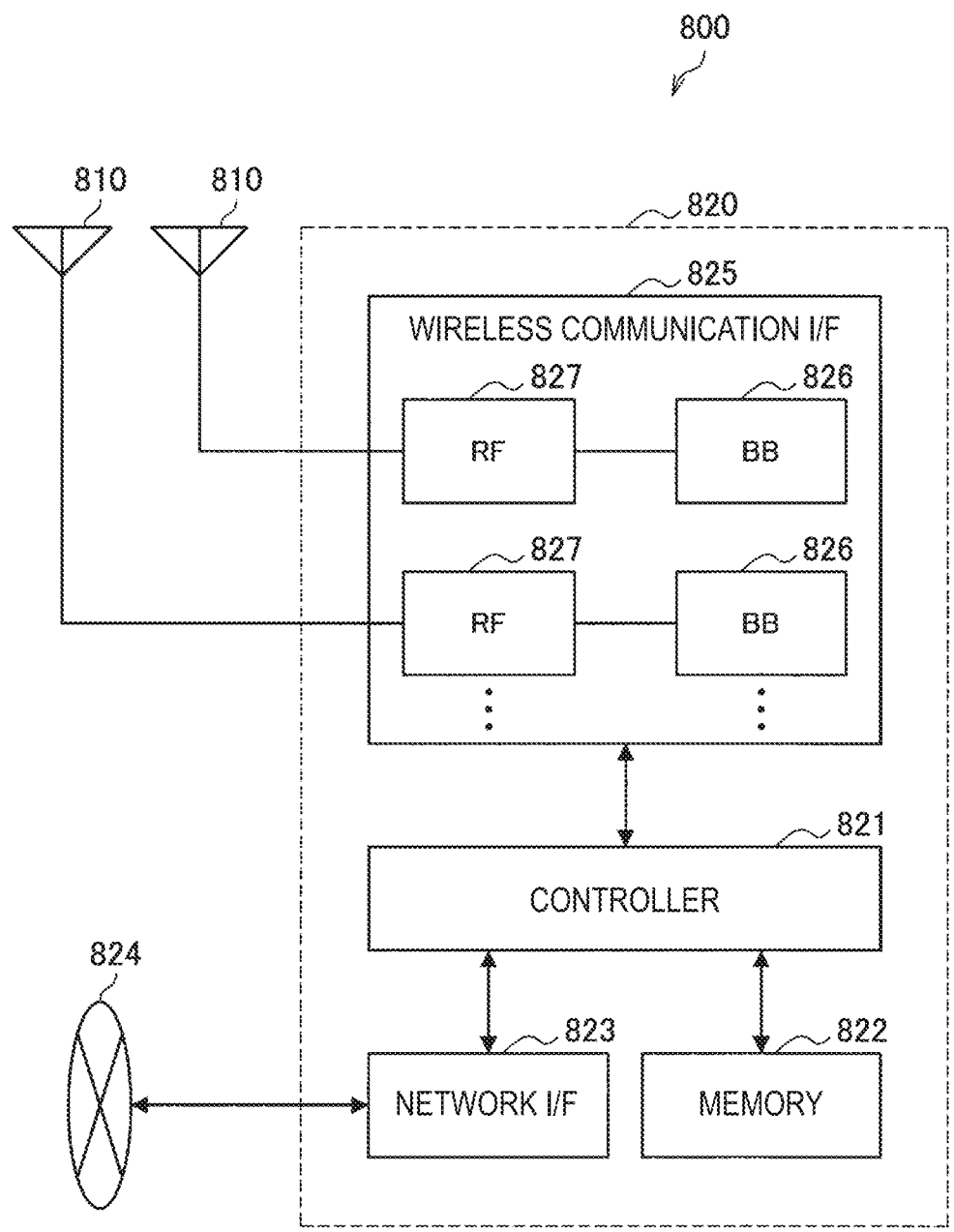
FIG. 19 is a block diagram illustrating a first example of a schematic configuration of an eNB.

FIG. 19 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 19, and the plurality of antennas 810 may, for example, correspond to a plurality of frequency bands used by the eNB 800. It should be noted that while FIG. 19 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 19, and the plurality of BB processors 826 may, for example, correspond to a plurality of frequency bands used by the eNB 800. Further, the wireless communication interface 825 may also include a plurality of the RF circuits 827, as illustrated in FIG. 19, and the plurality of RF circuits 827 may, for example, correspond to a plurality of antenna elements. Note that FIG. 19 illustrates an example in which the wireless communication interface 825 includes the plurality of BB processors 826 and the plurality of RF circuits 827, but the wireless communication interface 825 may include the single BB processor 826 or the single RF circuit 827.

Second Application Example

Figure 20:
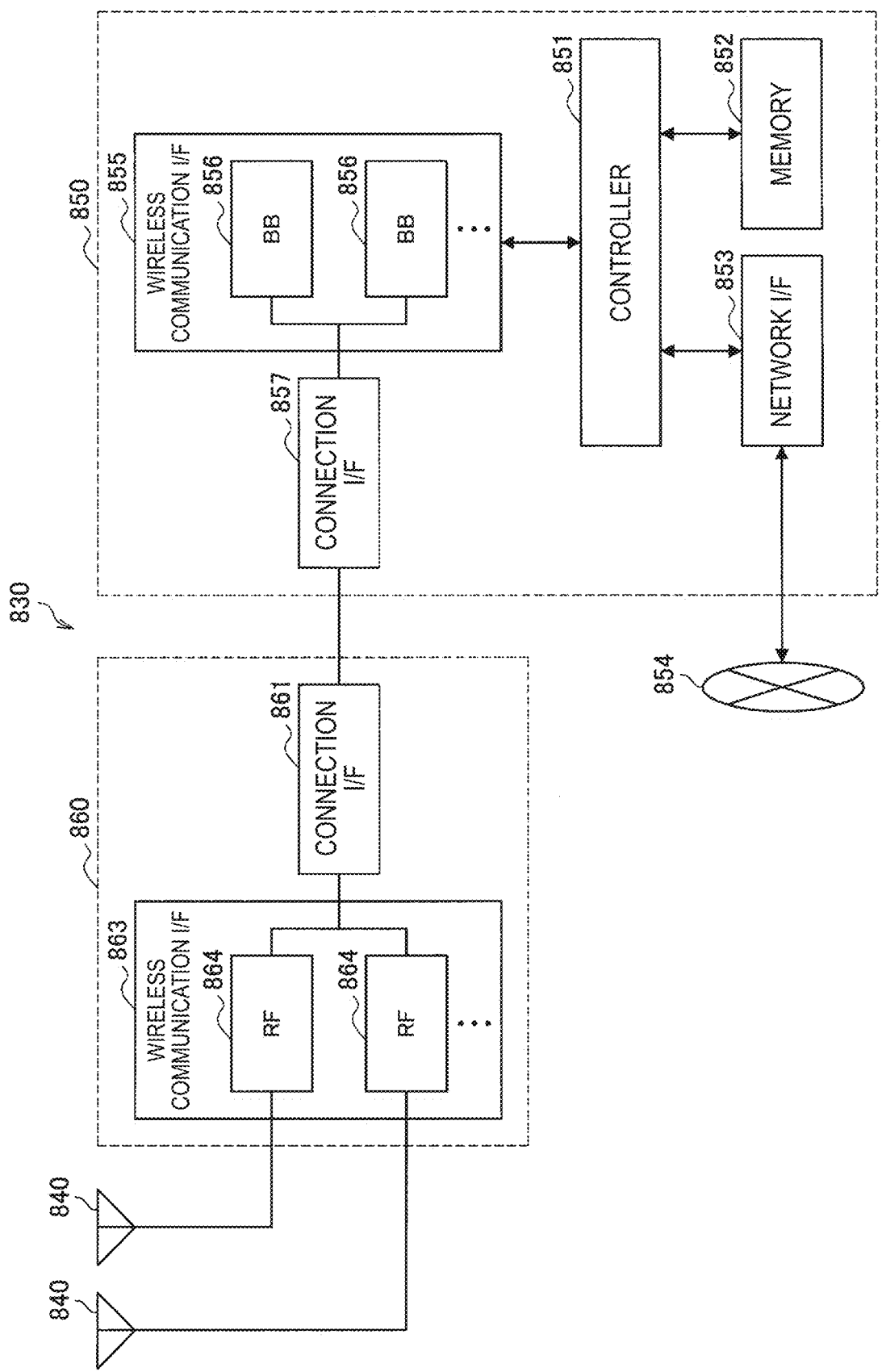
FIG. 20 is a block diagram illustrating a second example of the schematic configuration of the eNB.

FIG. 20 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 20, and the plurality of antennas 840 may, for example, correspond to a plurality of frequency bands used by the eNB 830. Note that FIG. 20 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 19.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 19 except that the BB processor 856 is connected to an RF circuit 864 of the RRH 860 via the connection interface 857. The wireless communication interface 855 may include a plurality of the BB processors 856, as illustrated in FIG. 20, and the plurality of BB processors 856 may, for example, correspond to a plurality of frequency bands used by the eNB 830. Note that FIG. 19 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 20, and the plurality of RF circuits 864 may, for example, correspond to a plurality of antenna elements. Note that FIG. 20 illustrates an example in which the wireless communication interface 863 includes the plurality of RF circuits 864, but the wireless communication interface 863 may include the single RF circuit 864.

The eNB 800, the eNB 830, the base station apparatus 820, or the base station apparatus 850 illustrated in FIGS. 20 and 21 may correspond to the base station device 1 described with reference to FIG. 8 and the like.

Application Examples for Terminal Device

First Application Example

Figure 21:
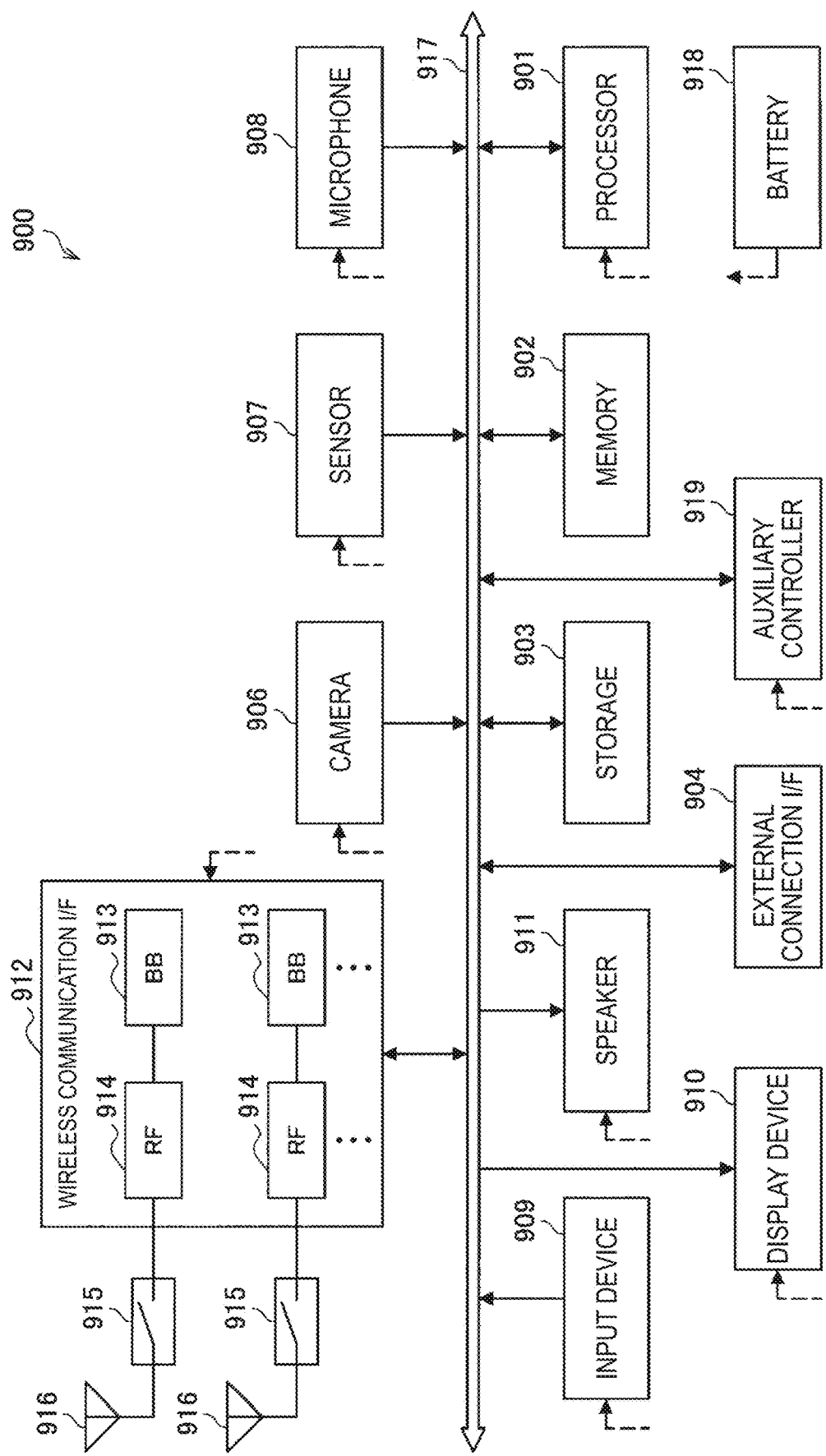
FIG. 21 is a block diagram illustrating an example of a schematic configuration of a smartphone.

FIG. 21 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 21. Note that FIG. 21 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 21. Note that FIG. 21 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 21 via a feeder line that is partially illustrated in the figure as a dashed line. The auxiliary controller 919, for example, operates a minimally necessary function of the smartphone 900 in a sleep mode.

Second Application Example

Figure 22:
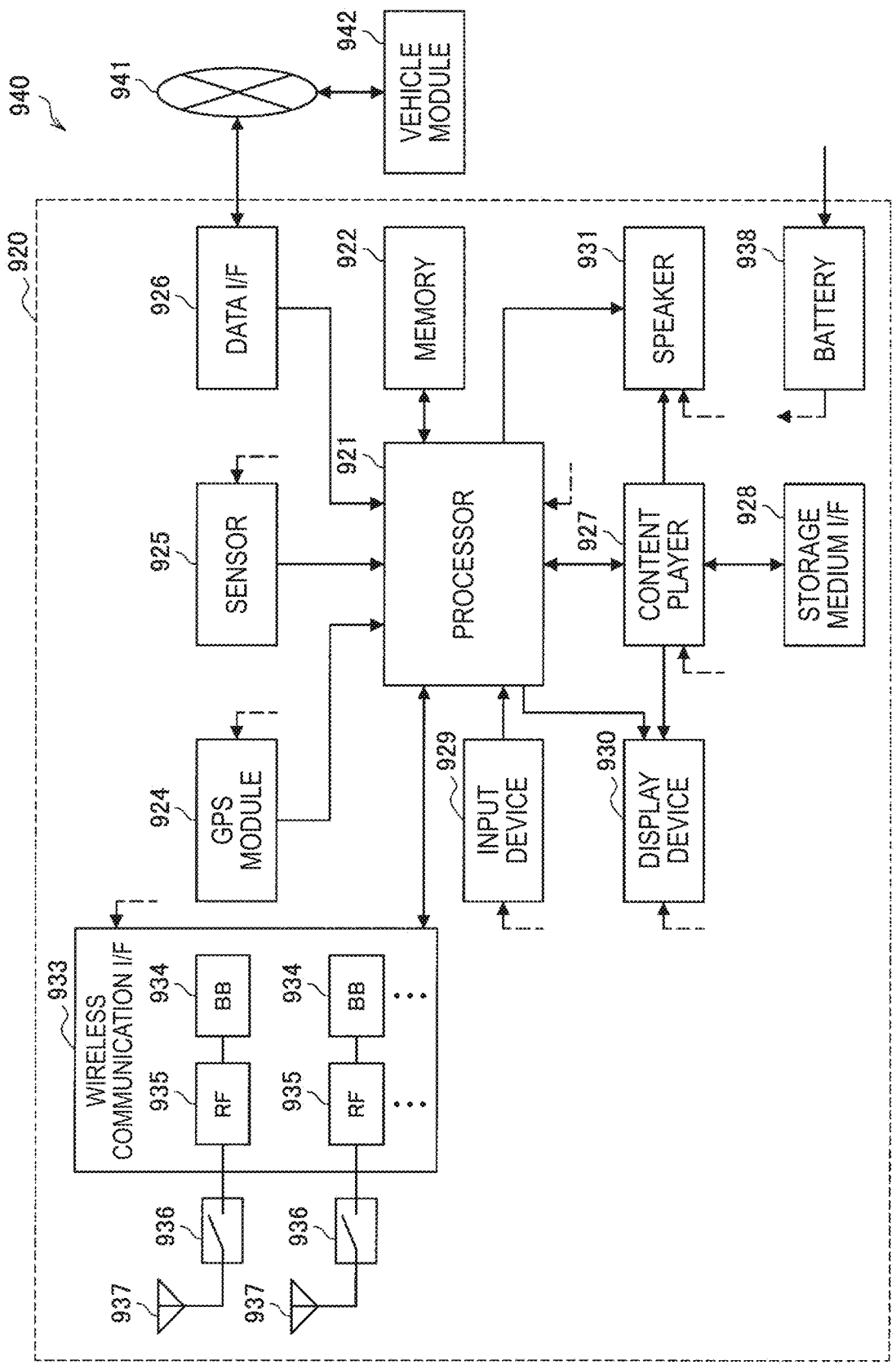
FIG. 22 is a block diagram illustrating an example of a schematic configuration of a car navigation apparatus.

FIG. 22 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 22. Note that FIG. 22 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 22. Note that FIG. 22 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 22 via a feeder line that is partially illustrated in the figure as a dashed line. Further, the battery 938 accumulates the electric power supplied from the vehicle.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A terminal device configured to perform communication with a base station device, including:
  a wireless transmitting unit configured to transmit an uplink channel using a first signal waveform or a second signal waveform on the basis of control information notified by the base station device,
  in which the first signal waveform is a multicarrier signal, and the second signal waveform is a single carrier signal.

(2)

The terminal device according to (1), in which the control information is information related to a frame configuration used for transmission of the uplink channel, and
  the wireless transmitting unit decides the first signal waveform or the second signal waveform on the basis of the frame configuration.

(3)

The terminal device according to (1) or (2), in which the control information is information related to a subcarrier interval used for transmission of the uplink channel, and
  the wireless transmitting unit decides the first signal waveform or the second signal waveform on the basis of the subcarrier interval.

(4)

The terminal device according to any one of (1) to (3), in which the control information is information related to a transmission mode related to spatial multiplexing in transmission of the uplink channel, and
  the wireless transmitting unit decides the first signal waveform or the second signal waveform on the basis of the transmission mode related to the spatial multiplexing.

(5)

The terminal device according to any one of (1) to (4), in which the control information is information related to a transmission time interval length in transmission of the uplink channel, and
  the wireless transmitting unit decides the first signal waveform or the second signal waveform on the basis of the transmission time interval length.

(6)

The terminal device according to any one of (1) to (5), in which the control information is information related to a transmission mode related to a schedule in transmission of the uplink channel, and
  the wireless transmitting unit decides the first signal waveform or the second signal waveform on the basis of the transmission mode related to the schedule.

(7)

The terminal device according to any one of (1) to (6), in which the control information is information related to a frequency band used for transmission of the uplink channel, and
  the wireless transmitting unit decides the first signal waveform or the second signal waveform on the basis of the frequency band.

(8)

The terminal device according to any one of (1) to (7), in which the control information is signal waveform notification information indicating whether a signal waveform for the uplink channel is a first signal waveform or a second signal waveform,
  the signal waveform notification information is included in allocation information of a physical layer used for allocation of the uplink channel and notified, and
  the wireless transmitting unit decides the first signal waveform or the second signal waveform on the basis of the signal waveform notification information.

(9)

The terminal device according to any one of (1) to (8), in which the control information is allocation information of a physical layer used for allocation of the uplink channel, and
  the wireless transmitting unit decides the first signal waveform or the second signal waveform on the basis of a format of the allocation information.

(10)

The terminal device according to any one of (1) to (9), in which the control information is allocation information of a physical layer used for allocation of the uplink channel, and the wireless transmitting unit decides the first signal waveform or the second signal waveform on the basis of a search space in which the allocation information is detected.

(11)

The terminal device according to any one of (1) to (10), in which the wireless transmitting unit decides the first signal waveform or the second signal waveform on the basis of a type of frame used for transmission of the uplink channel.

(12)

A base station device configured to perform communication with a terminal device, including:
a wireless receiving unit configured to receive an uplink channel transmitted using a first signal waveform or a second signal waveform on the basis of control information of which the terminal device is notified,
in which the first signal waveform is a multicarrier signal, and the second signal waveform is a single carrier signal.

(13)

A communication method used in a terminal device configured to perform communication with a base station device, including:
a step of transmitting an uplink channel using a first signal waveform or a second signal waveform on the basis of control information notified by the base station device,
in which the first signal waveform is a multicarrier signal, and the second signal waveform is a single carrier signal.

(14)

A communication method used in a base station device configured to perform communication with a terminal device, including:
a step of receiving an uplink channel transmitted using a first signal waveform or a second signal waveform on the basis of control information of which the terminal device is notified,
in which the first signal waveform is a multicarrier signal, and the second signal waveform is a single carrier signal.

REFERENCE SIGNS LIST 1 base station device
101 higher layer processing unit
1011 setting unit
1013 communication control unit
103 control unit
105 receiving unit
1051 decoding unit
1053 demodulating unit
1055 demultiplexing unit
1057 wireless receiving unit
1059 channel measuring unit
107 transmitting unit
1071 encoding unit
1073 modulating unit
1075 multiplexing unit
1077 wireless transmitting unit
1079 downlink reference signal generating unit
109 transceiving antenna
2 terminal device
201 higher layer processing unit
2011 setting unit
2013 communication control unit
203 control unit
205 receiving unit
2051 decoding unit
2053 demodulating unit
2055 demultiplexing unit
2057 wireless receiving unit
2059 channel measuring unit
207 transmitting unit
2071 encoding unit
2073 modulating unit
2075 multiplexing unit
2077 wireless transmitting unit
2079 uplink reference signal generating unit
209 transceiving antenna

The invention claimed is:

1. A terminal device configured to perform communication with a base station device, comprising:
processing circuitry configured to control a receiver and a transmitter;
the receiver configured to receive a control information for an uplink channel from the base station; and
the transmitter configured to transmit the uplink channel using a first signal waveform or a second signal waveform, based on the control information, wherein
the first signal waveform is signal which is generated without performing a discrete Fourier transform conversion process, and the second signal waveform is a signal which is generated with performing the discrete Fourier transform conversion process, and
in a case where the second signal waveform is used by the transmitter, only a single multiple-input and multiple-output (MIMO) layer transmission is used for the uplink channel.

2. The terminal apparatus according to claim 1, wherein modulation schemes that are used in a predetermined shared channel are different between the first signal waveform and the second signal waveform.

3. The terminal apparatus according to claim 1, wherein the control information is transmitted by an radio resource control (RRC) signaling.

4. The terminal apparatus according to claim 1, wherein the control information is transmitted by a physical layer signaling.

5. The terminal device according to claim 1, wherein a transmission mode for the predetermined shared channel is a transmission mode based on an uplink grant from the base station.

6. The terminal device according to claim 1, wherein the control information is information related to a frame configuration used for transmission of the uplink channel, and
the processing circuitry decides whether the transmitter uses the first signal waveform or the second signal waveform for transmitting the uplink channel on a basis of the frame configuration.

7. The terminal device according to claim 1, wherein the control information is information related to a subcarrier interval used for transmission of the uplink channel, and
the processing circuitry decides whether the transmitter uses the first signal waveform or the second signal waveform for transmitting the uplink channel on a basis of the subcarrier interval.

8. The terminal device according to claim 1, wherein the control information is information related to a transmission mode related to spatial multiplexing in transmission of the uplink channel, and
the processing circuitry decides whether the transmitter uses the first signal waveform or the second signal waveform for transmitting the uplink channel on a basis of the transmission mode related to the spatial multiplexing.

9. The terminal device according to claim 1, wherein the control information is information related to a transmission time interval length in transmission of the uplink channel, and the processing circuitry decides whether the transmitter uses the first signal waveform or the second signal waveform for transmitting the uplink channel on a basis of the transmission time interval length.

10. The terminal device according to claim 1, wherein the control information is information related to a transmission mode related to a schedule in transmission of the uplink channel, and the processing circuitry decides whether the transmitter uses the first signal waveform or the second signal waveform for transmitting the uplink channel on a basis of the transmission mode related to the schedule.

11. The terminal device according to claim 1, wherein the control information is information related to a frequency band used for transmission of the uplink channel, and the processing circuitry decides whether the transmitter uses the first signal waveform or the second signal waveform for transmitting the uplink channel on a basis of the frequency band.

12. The terminal device according to claim 1, wherein the control information is signal waveform notification information indicating whether a signal waveform for the uplink channel is a first signal waveform or a second signal waveform, the signal waveform notification information is included in allocation information of a physical layer used for allocation of the uplink channel and notified, and the processing circuitry decides whether the transmitter uses the first signal waveform or the second signal waveform for transmitting the uplink channel on a basis of the signal waveform notification information.

13. The terminal device according to claim 1, wherein the control information is allocation information of a physical layer used for allocation of the uplink channel, and the processing circuitry decides whether the transmitter uses the first signal waveform or the second signal waveform for transmitting the uplink channel on a basis of a format of the allocation information.

14. The terminal device according to claim 1, wherein the control information is allocation information of a physical layer used for allocation of the uplink channel, and the processing circuitry decides whether the transmitter uses the first signal waveform or the second signal waveform for transmitting the uplink channel on a basis of a search space in which the allocation information is detected.

15. The terminal device according to claim 1, wherein the processing circuitry decides whether the transmitter uses the first signal waveform or the second signal waveform for transmitting the uplink channel on a basis of a type of frame used for transmission of the uplink channel.

16. A base station device configured to perform communication with a terminal device, comprising:

a transmitter configured to transmit a control information for an uplink channel to the terminal device; and a receiver configured to receive the uplink channel transmitted using a first signal waveform or a second signal waveform by the terminal device, based on the control information, wherein the first signal waveform is a signal which is generated without performing a discrete Fourier transform conversion process, and the second signal waveform is a signal which is generated with performing the discrete Fourier transform conversion process, and in a case where the second signal waveform is used by the terminal device, only a single multiple-input and multiple-output (MIMO) layer transmission is used for the uplink channel.

17. A communication method used in a terminal device configured to perform communication with a base station device, comprising:

receiving a control information for an uplink channel from the base station; and transmitting the uplink channel using a first signal waveform or a second signal waveform, based on the control information, wherein the first signal waveform is signal which is generated without performing a discrete Fourier transform conversion process, and the second signal waveform is a signal which is generated with performing the discrete Fourier transform conversion process, and in a case where the second signal waveform is used in the transmitting, only a single multiple-input and multiple-output (MIMO) layer transmission is used for the uplink channel.

18. A communication method used in a base station device configured to perform communication with a terminal device, comprising:

transmitting a control information for an uplink channel to the terminal device; and receiving the uplink channel transmitted using a first signal waveform or a second signal waveform by the terminal device, based on the control information, wherein the first signal waveform is a signal which is generated without performing a discrete Fourier transform conversion process, and the second signal waveform is a signal which is generated with performing the discrete Fourier transform conversion process, and in a case where the second signal waveform is used by the terminal device, only a single multiple-input and multiple-output (MIMO) layer transmission is used for the uplink channel.

\* \* \* \* \*